US012611603B2

(12) United States Patent
Yamamoto et al.

(10) Patent No.: US 12,611,603 B2
(45) Date of Patent: Apr. 28, 2026

(54) STORAGE MEDIUM, GAME SYSTEM, GAME APPARATUS, AND GAME PROCESSING METHOD

(71) Applicant: NINTENDO CO., LTD., Kyoto (JP)

(72) Inventors: Naoya Yamamoto, Kyoto (JP); Daigo Shimizu, Kyoto (JP); Tadashi Sakamoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 426 days.

(21) Appl. No.: 18/491,268

(22) Filed: Oct. 20, 2023

(65) Prior Publication Data

US 2024/0252922 A1 Aug. 1, 2024

(30) Foreign Application Priority Data

Feb. 1, 2023 (JP) ................................. 2023-014132

(51) Int. Cl.
| | |
|---|---|
| *A63F 13/5378* | (2014.01) |
| *A63F 13/56* | (2014.01) |
| *A63F 13/79* | (2014.01) |

(52) U.S. Cl.
CPC .......... *A63F 13/5378* (2014.09); *A63F 13/56* (2014.09); *A63F 13/79* (2014.09)

(58) Field of Classification Search
CPC ...... A63F 13/5378; A63F 13/56; A63F 13/79; A63F 13/573; A63F 13/5255
See application file for complete search history.

(56) References Cited

U.S. PATENT DOCUMENTS

| | | | |
|---|---|---|---|
| 2002/0198047 A1 | 12/2002 | Hinami et al. | |
| 2018/0085672 A1* | 3/2018 | Oiso ........................ | A63F 13/32 |
| 2025/0050217 A1* | 2/2025 | Duplessie ............... | A63F 13/56 |

FOREIGN PATENT DOCUMENTS

| | | | | | |
|---|---|---|---|---|---|
| CN | 115006842 A | * | 9/2022 | ......... | A63F 13/5378 |
| CN | 117899470 A | * | 4/2024 | ............. | A63F 13/56 |
| JP | H10-156042 | | 6/1998 | | |
| JP | 2001-300131 | | 10/2001 | | |
| JP | 2010-266256 | | 11/2010 | | |
| JP | 2013-104724 | | 5/2013 | | |

(Continued)

OTHER PUBLICATIONS

Apr. 2, 2024 Office Action issued in Japanese Patent Application No. 2023-014132, pp. 1-6 [machine translation included].

(Continued)

*Primary Examiner* — Peter J Iannuzzi

(74) *Attorney, Agent, or Firm* — Nixon & Vanderhye PC

(57) ABSTRACT

Time-series records of locations of a player character from the start of a game are stored into a storage medium. One of a plurality of layers corresponding to heights in a virtual space in a map image having the plurality of layers is displayed according to a user's first command. Track display is performed according to the user's second command when the map image is being displayed, wherein the player character's tracks based on the records are displayed, overlaying the map image of the layer being displayed, and a portion of the tracks based on the records at the height corresponding to the layer being displayed are displayed in a display form different from that of portions of the tracks based on the records at the heights corresponding to the layers other than the layer being displayed.

30 Claims, 23 Drawing Sheets

(56)            References Cited

FOREIGN PATENT DOCUMENTS

JP          2018-050866          4/2018
JP              6744182  B2      8/2020

OTHER PUBLICATIONS

[Horror Game Live] Siren: Play NT live! Aiming to escape from the hospital, YouTube [online][Video], Apr. 23, 2016, [Searched on Mar. 19, 2024], URL:https://www.youtube.com/watch?y=tierLS-sTW4 especially see video time [09:30]-[17:37] pp. 1-9.

"The Legend of Zelda: Breath of the Wild" information on the first additional content "Conqueror of Trials" included in the Expansion Pass has been released. Hard mode etc. was added, 4Gamer [online], [Searched on Mar. 18, 2024], URL:https://www.4gamer.net/games/341/G034168/20170502006 especially see the description regarding "Footstep Mode" pp. 1-8.

The Legend of Zelda: Breath of the Wild DLC#1 [Trial of the Sword], YouTube [online] [video], Jun. 30, 2017, [Searched on Mar. 18, 2024], URL:https://www.youtube.com/watch?y=p4_qZitoySM see all video times; pp. 1-6.

[Genshin] Underground map appears on Teiwat map, Hidden Garner's Handyman [online], Jan. 8, 2023, [Searched on Mar. 12, 2024] URL:https://usefulmc.com/post-2537 especially see the text and drawings; pp. 1-5.

* cited by examiner

F I G.  1
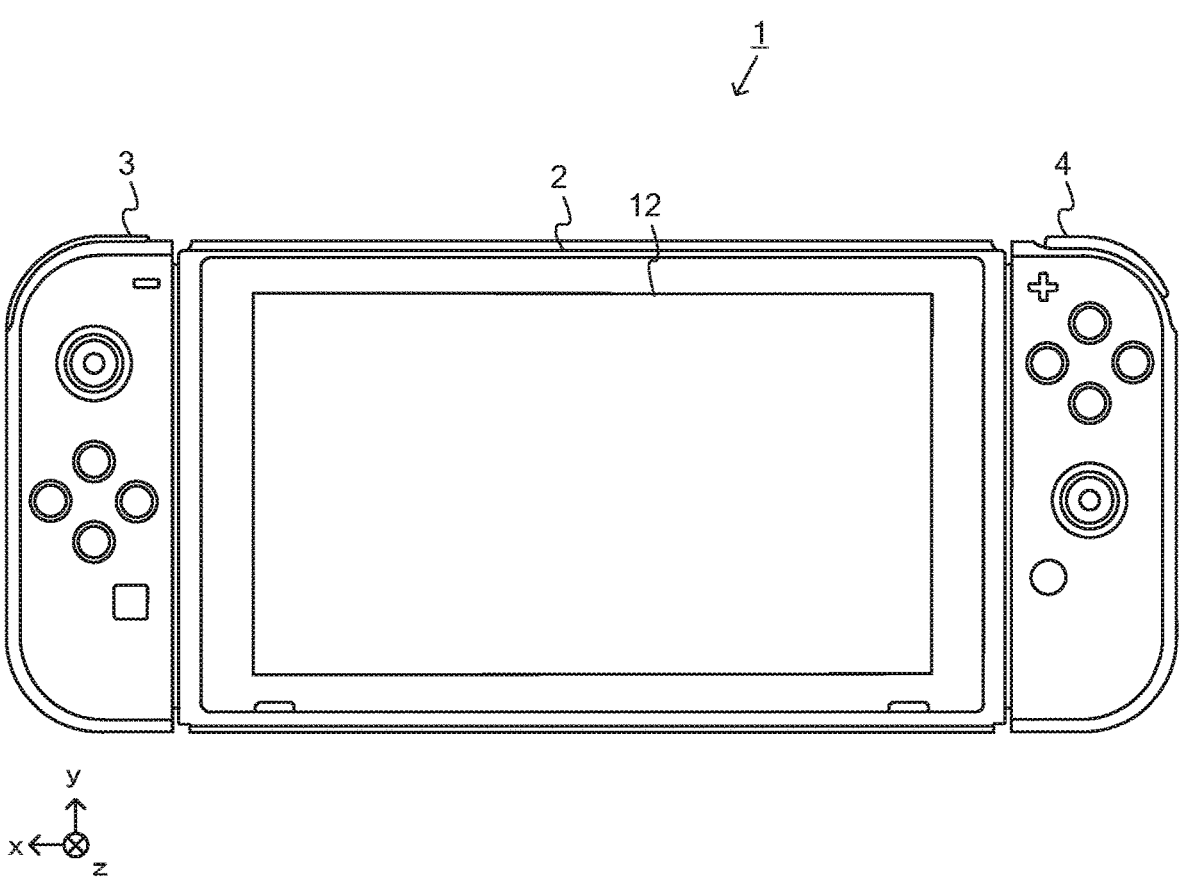

F I G.  2
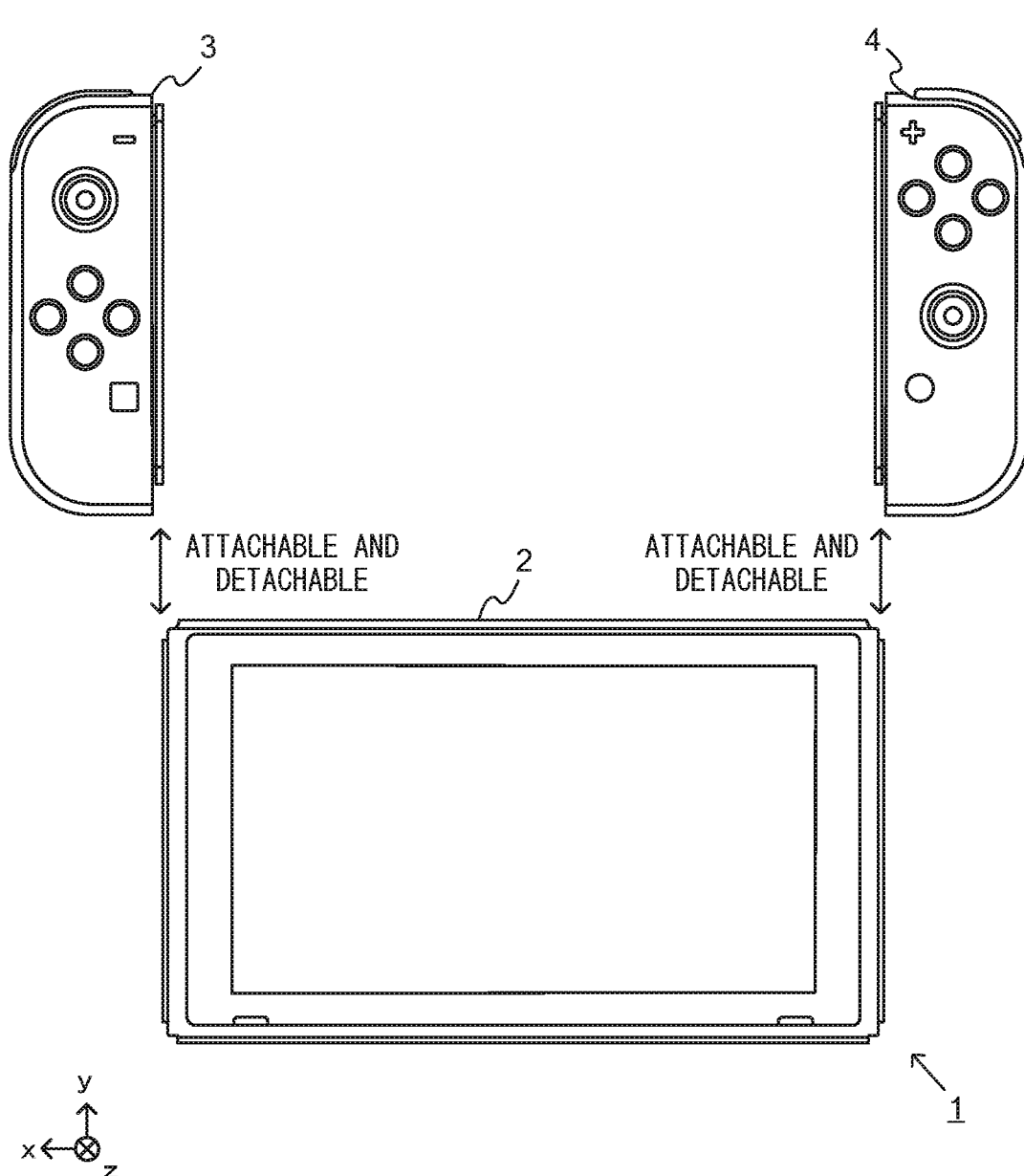
ATTACHABLE AND DETACHABLE        ATTACHABLE AND DETACHABLE

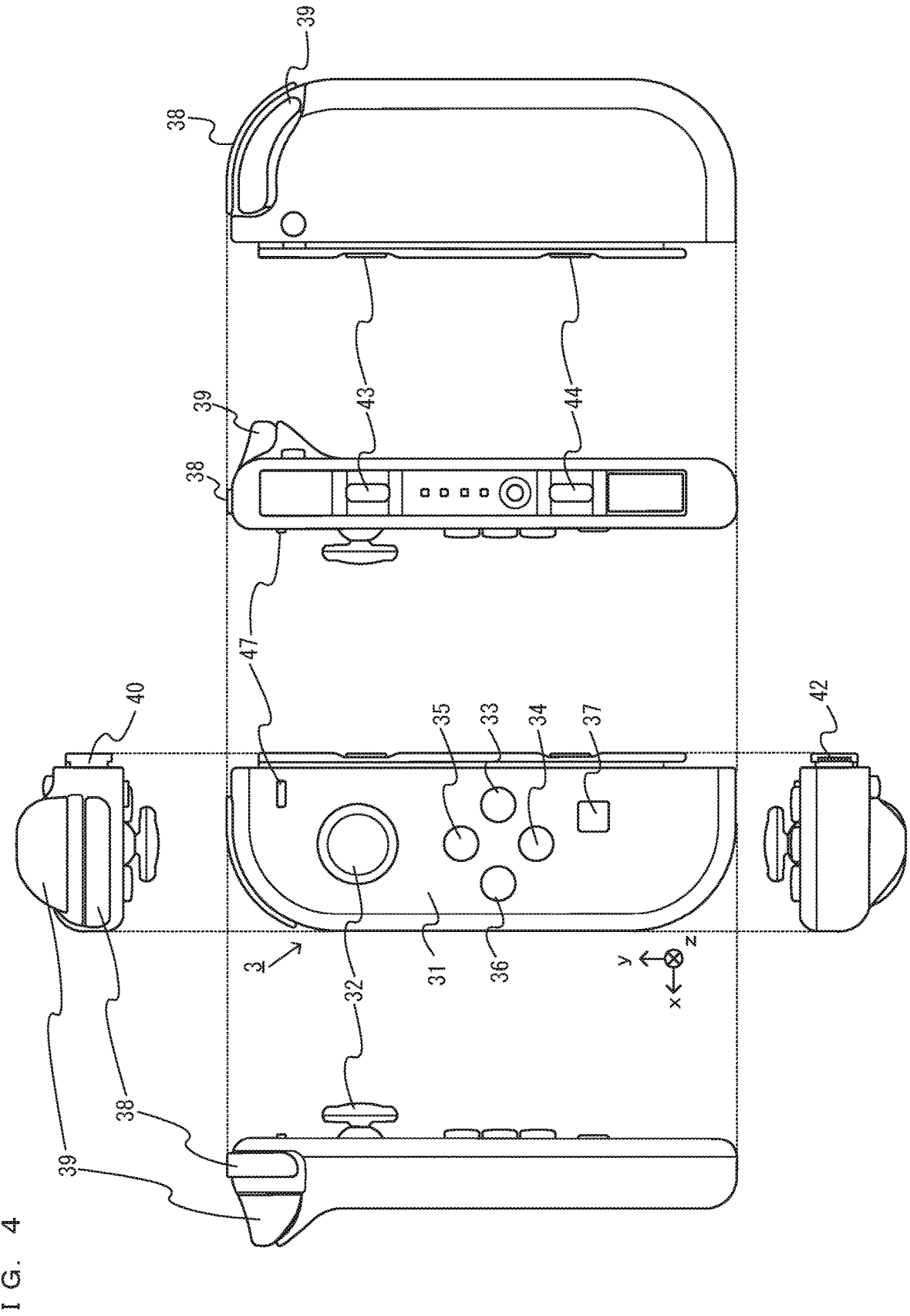
F I G. 4

F I G. 5
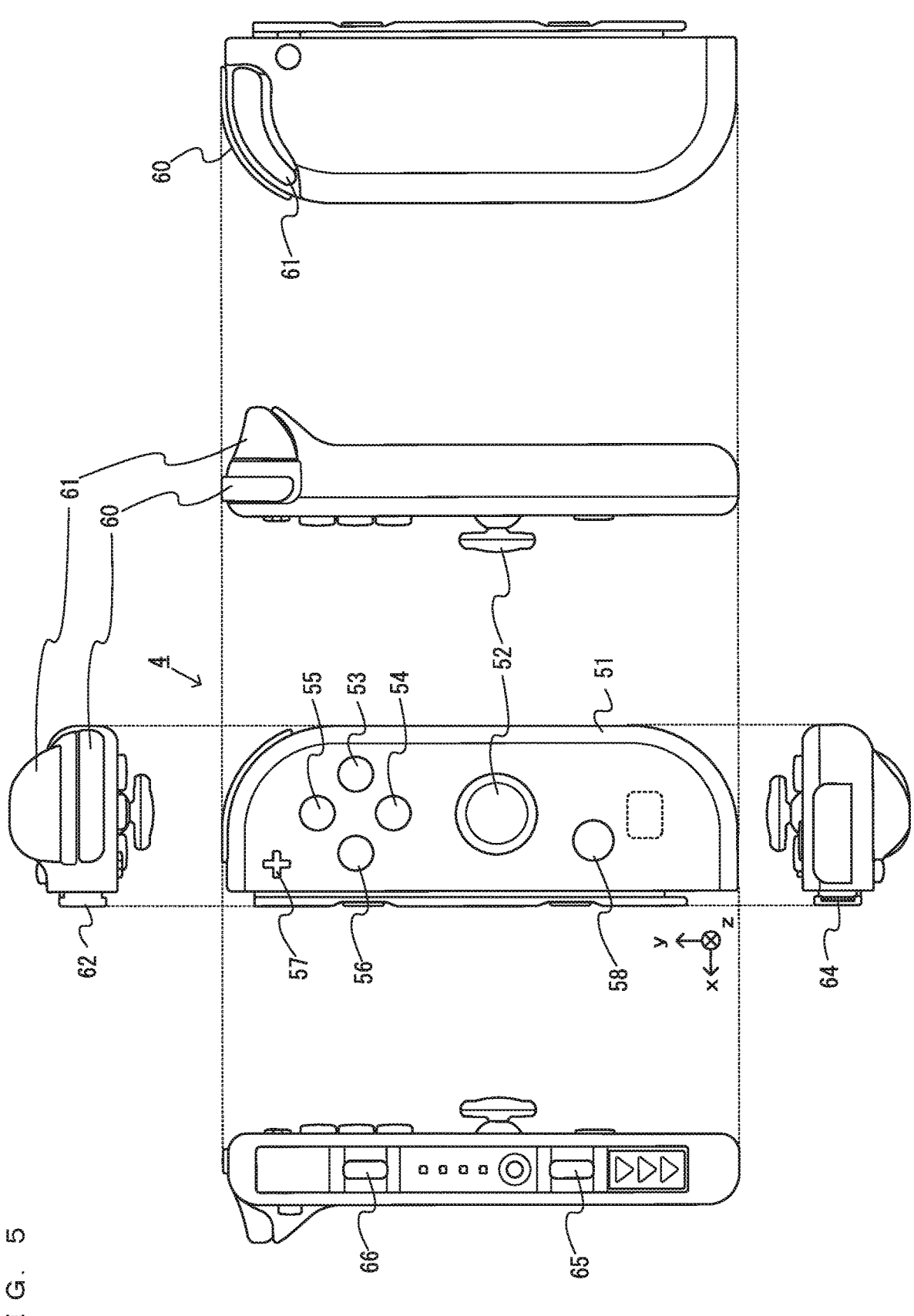

F I G.  6
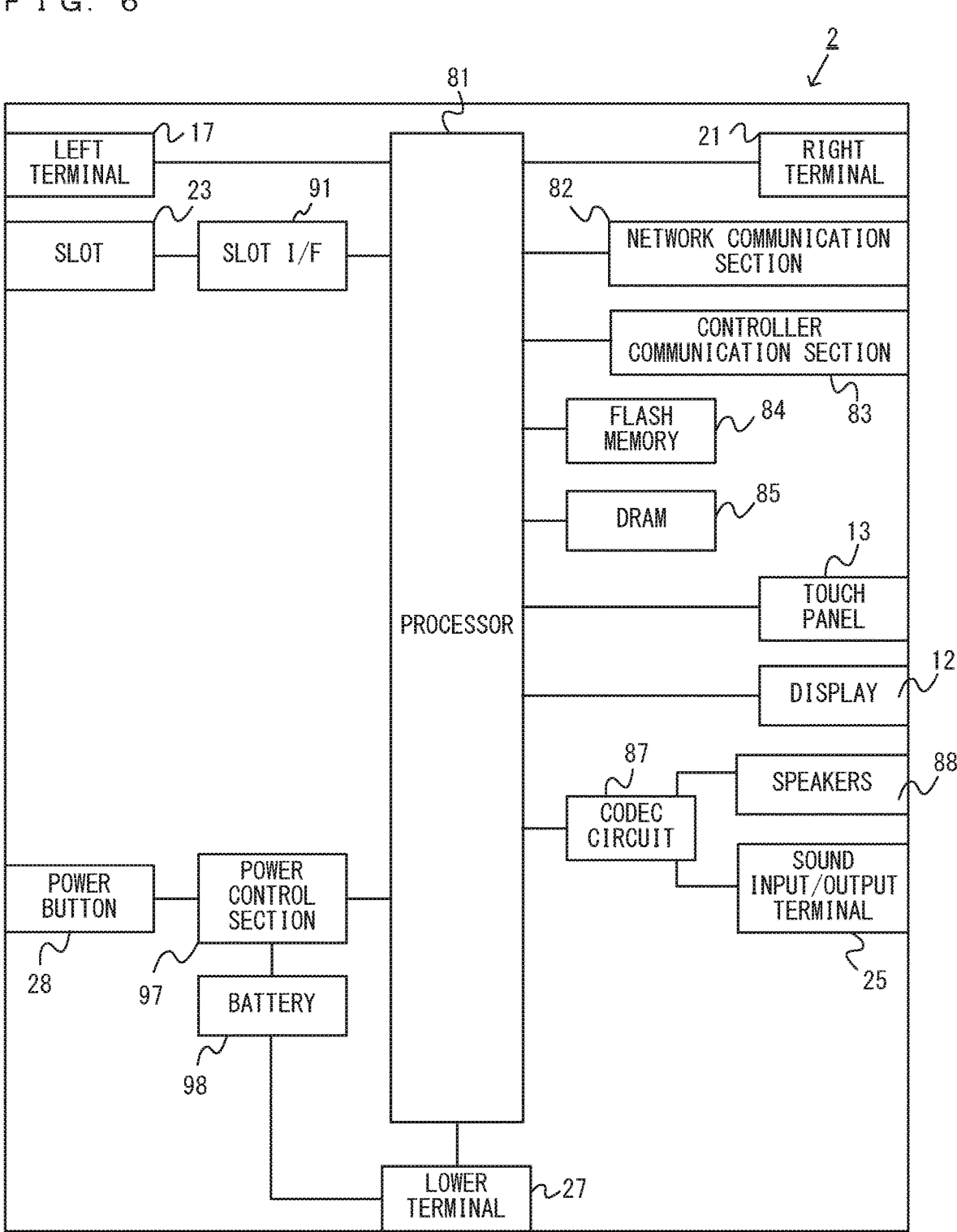

F I G. 7
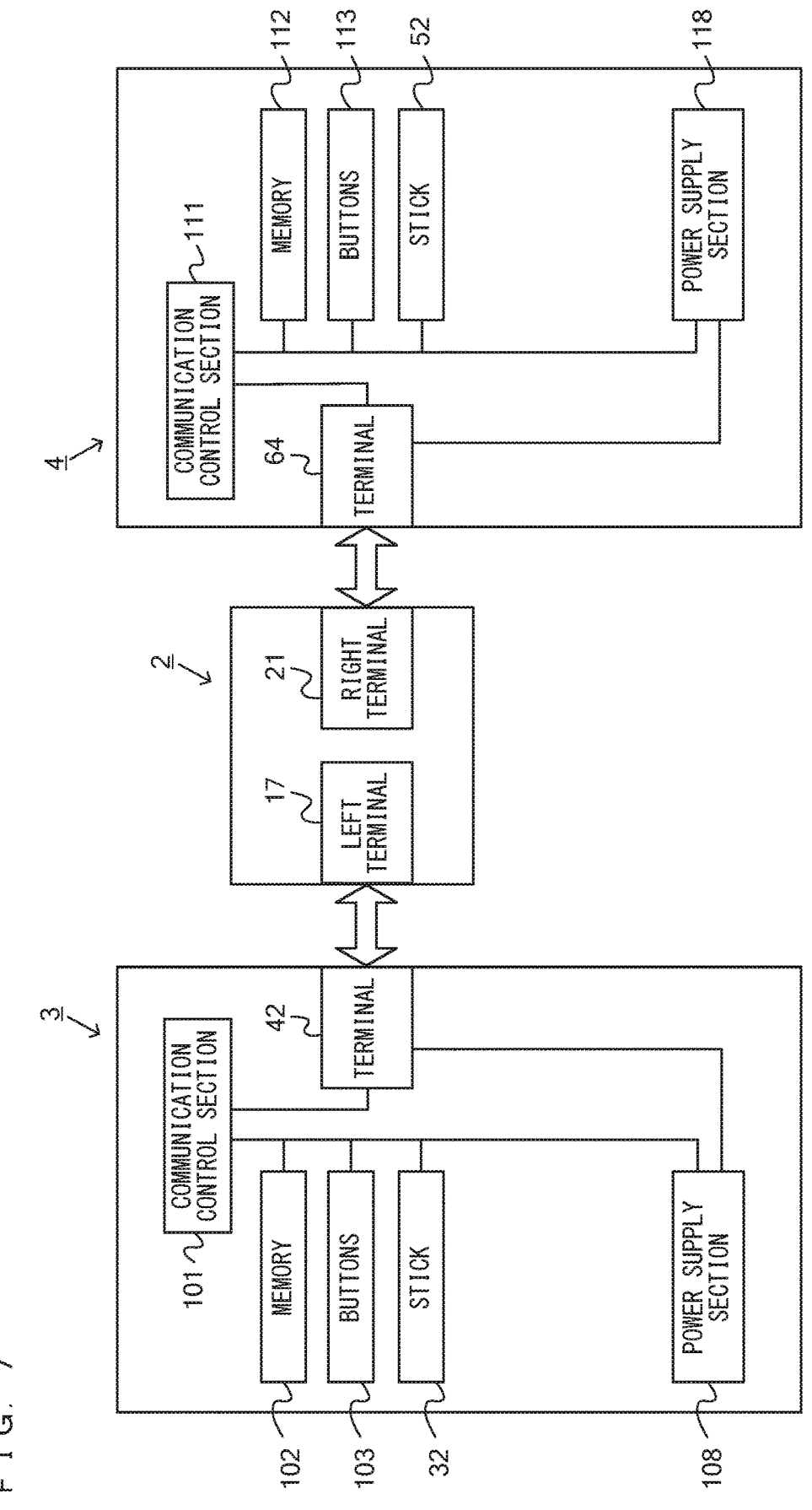

F I G.  8
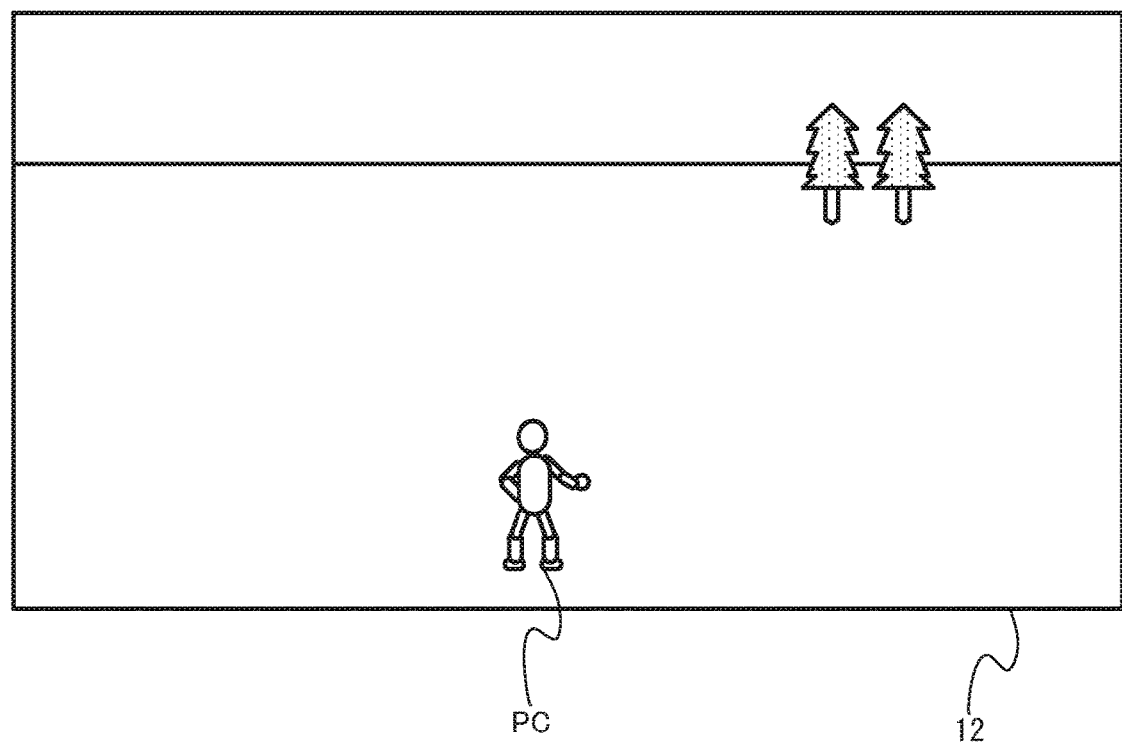
PC                                                    12

F I G. 9
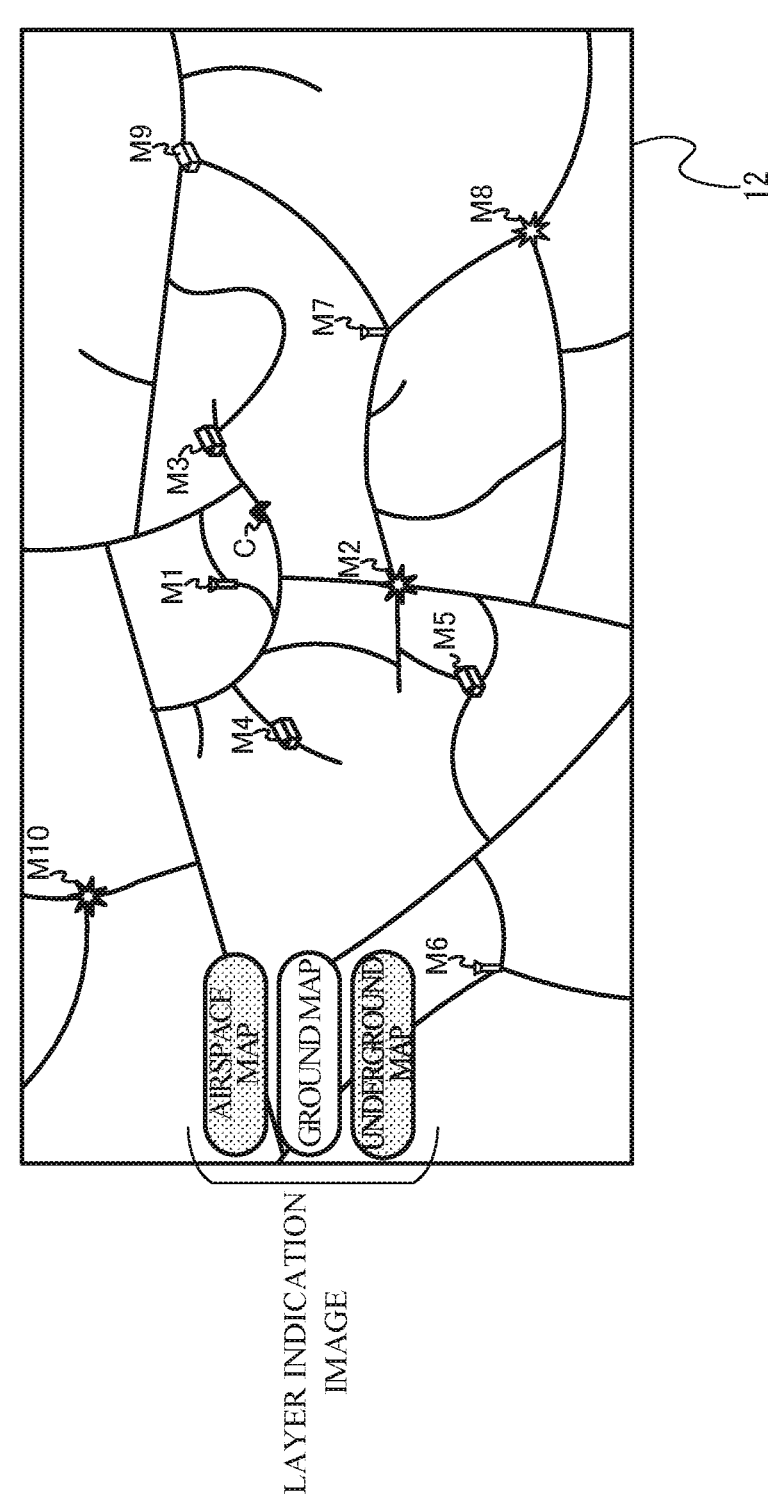

F I G .  1 1
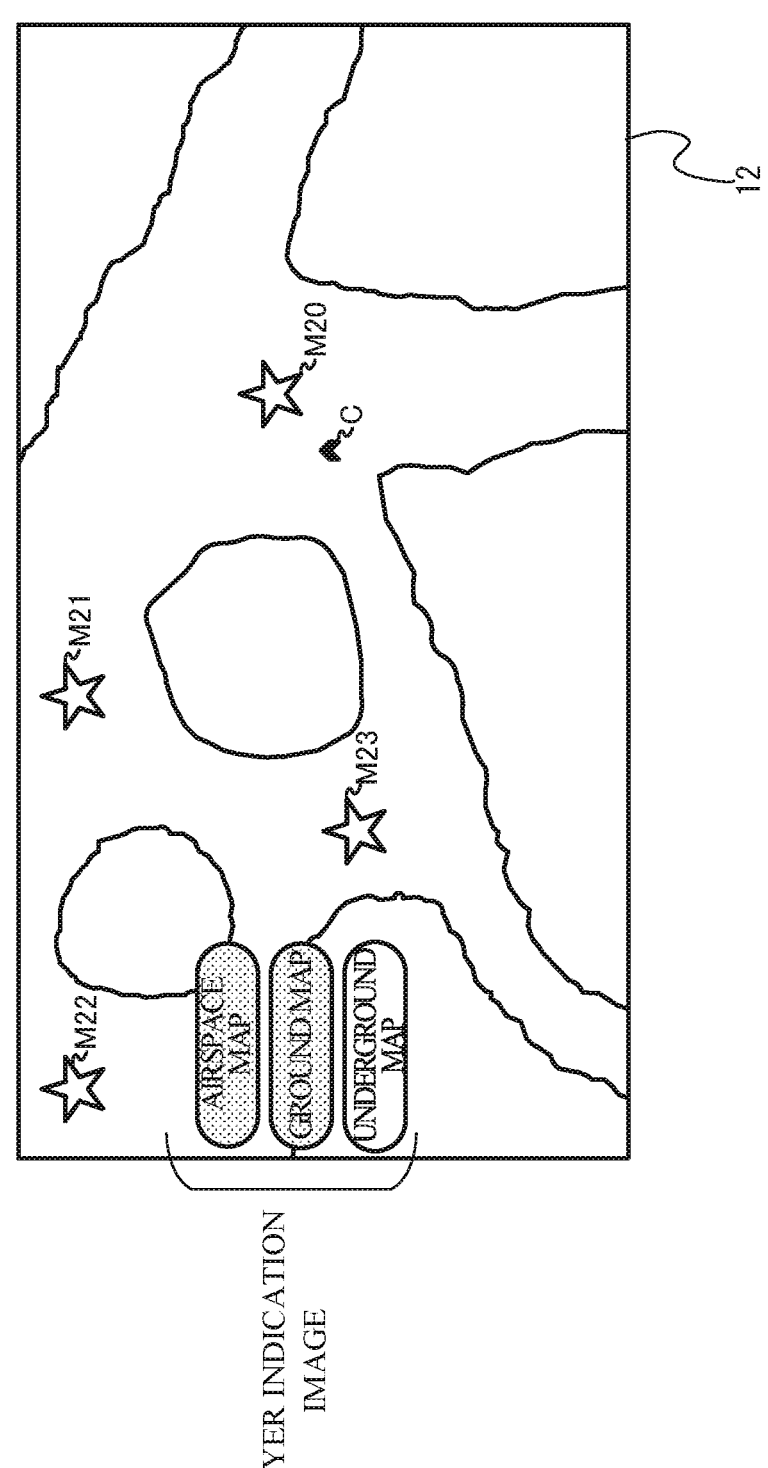

F I G .  1 2
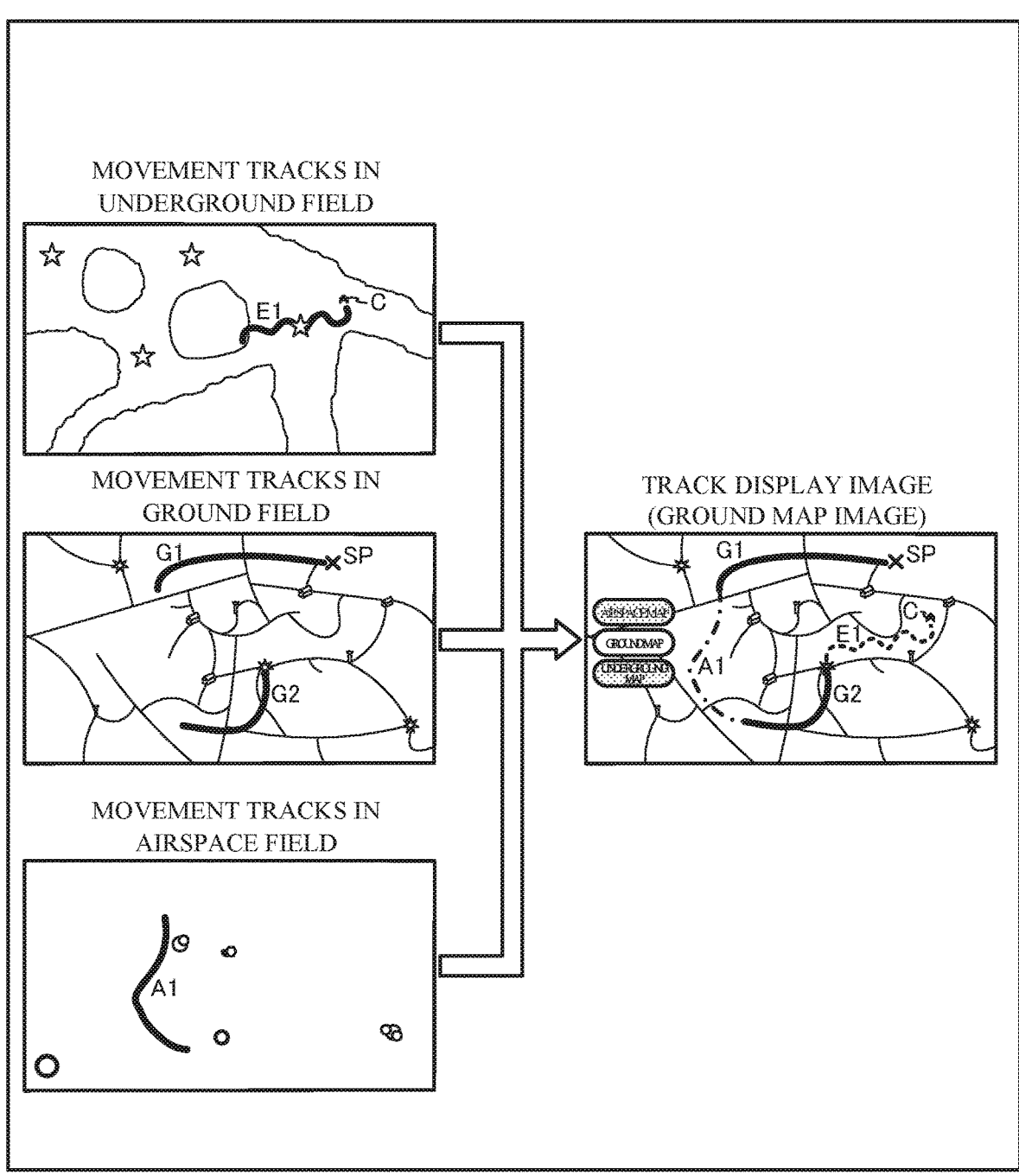

F I G. 1 4
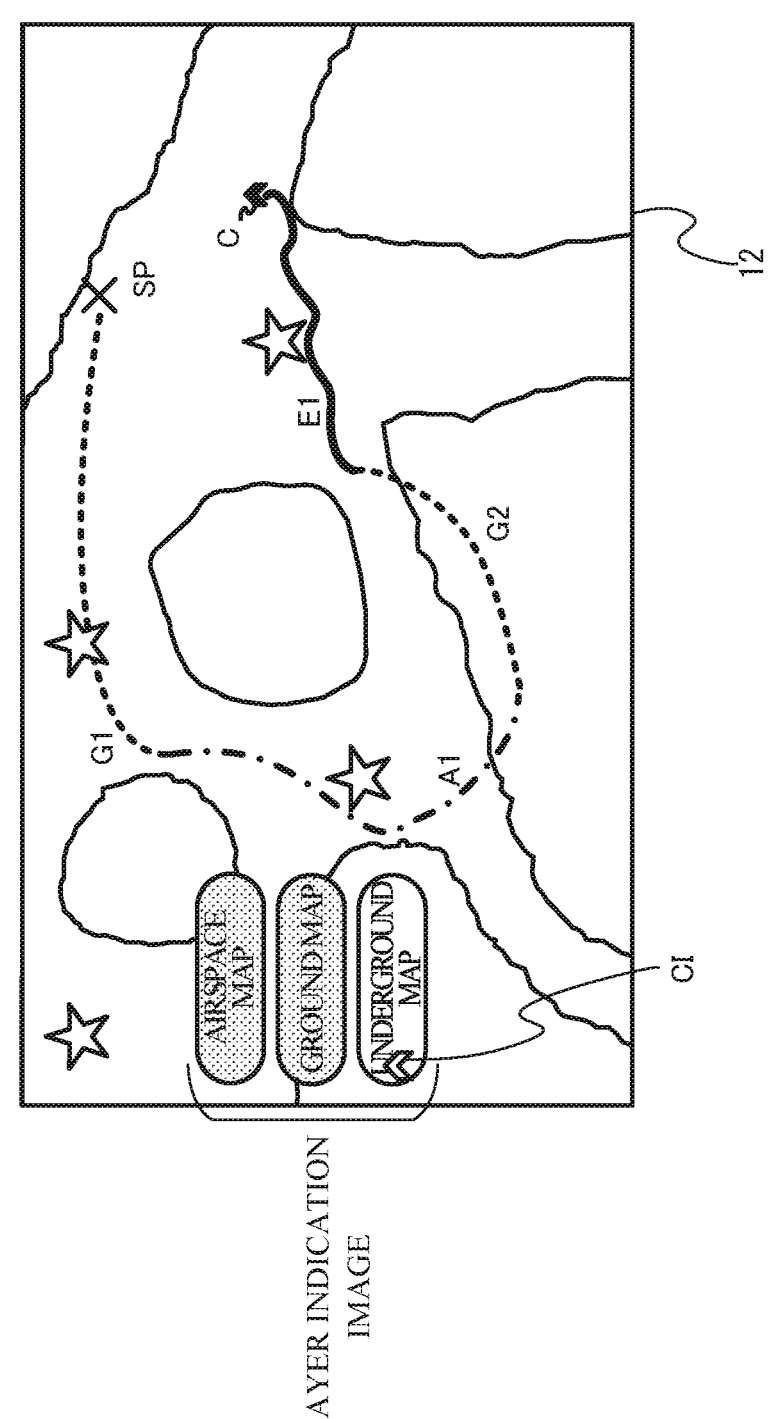

F I G.  1 5
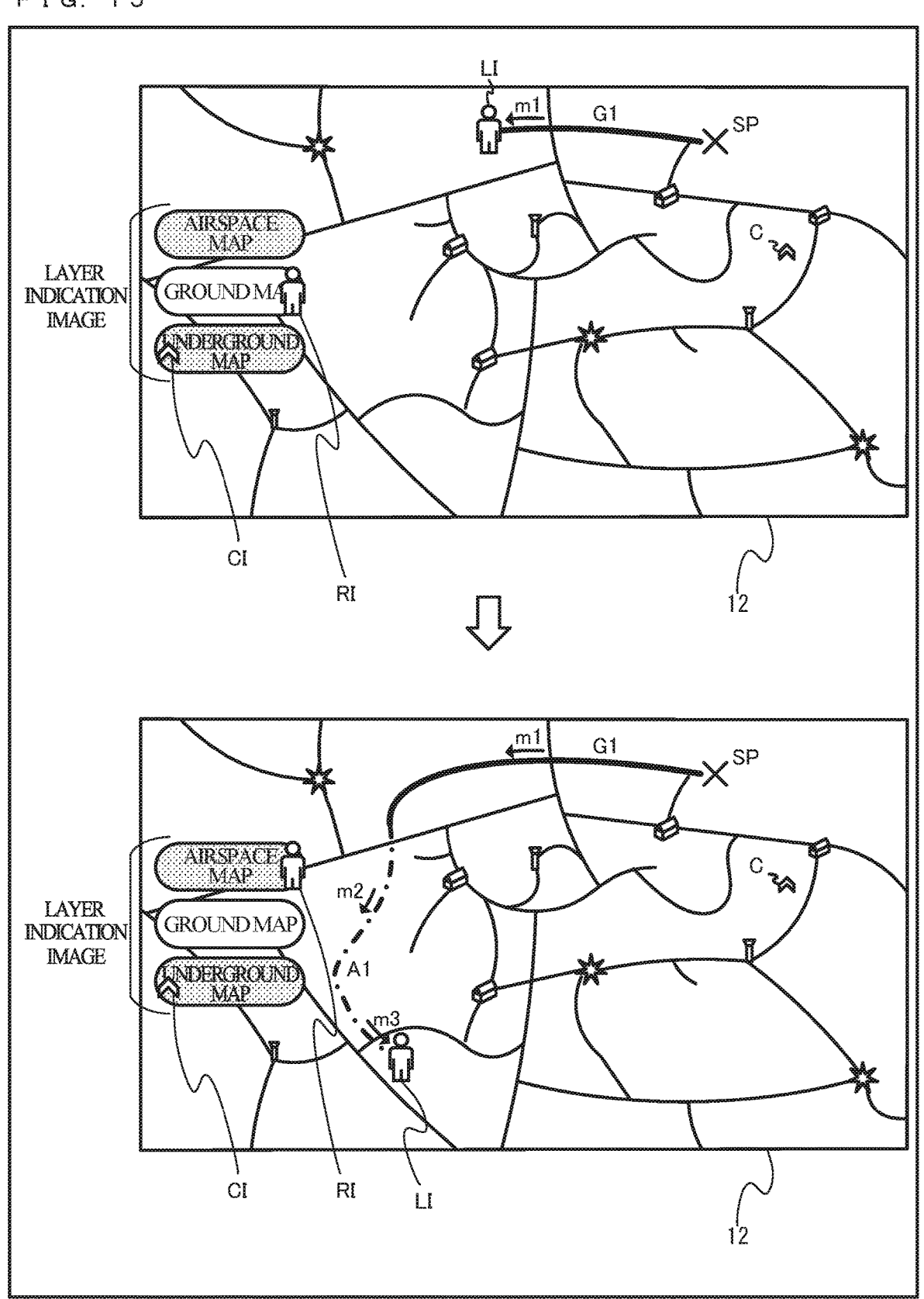

F I G .  1 6
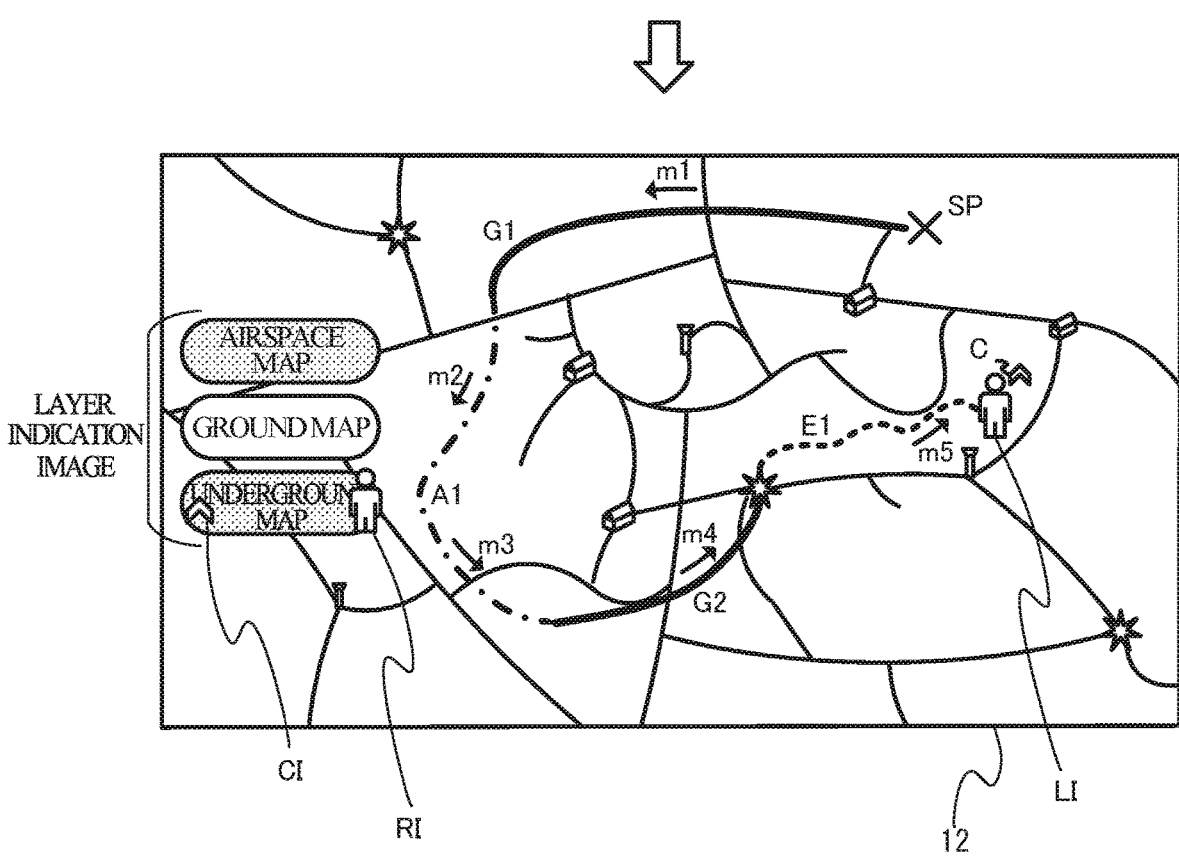

F I G. 1 7
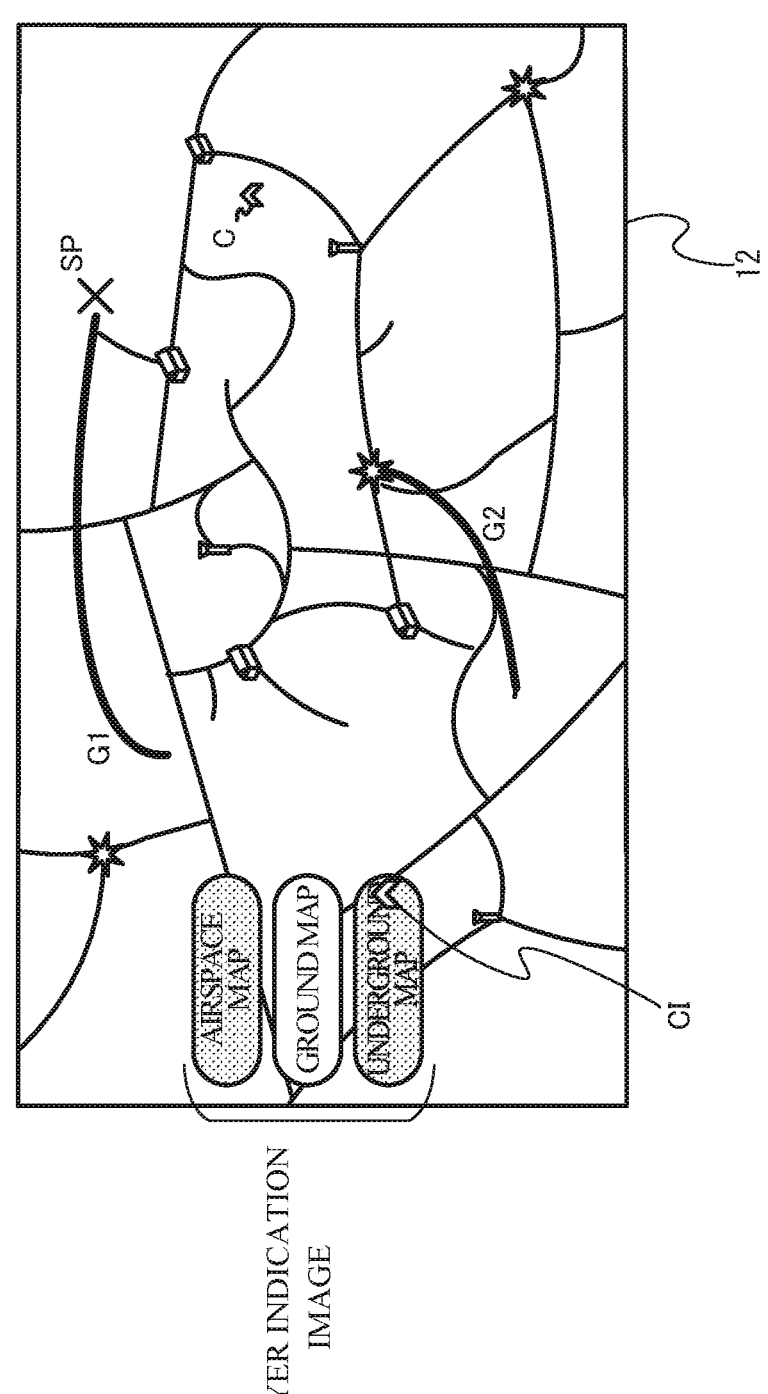

F I G.  1 8
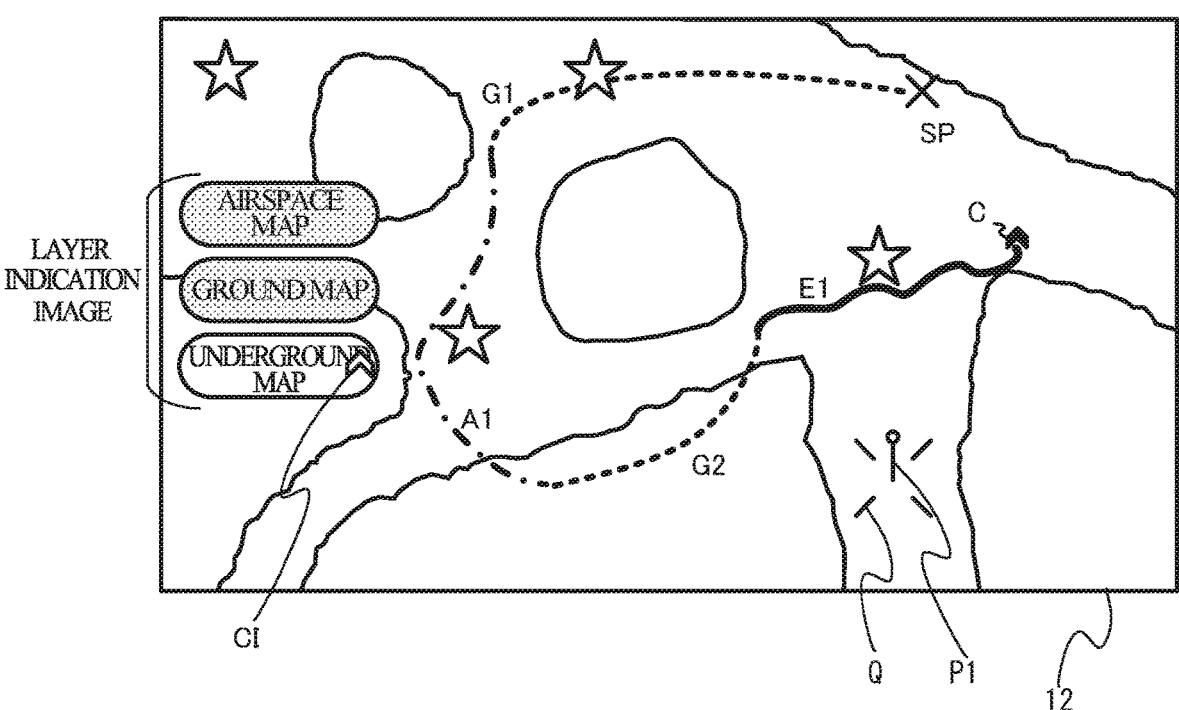

F I G.  2 0
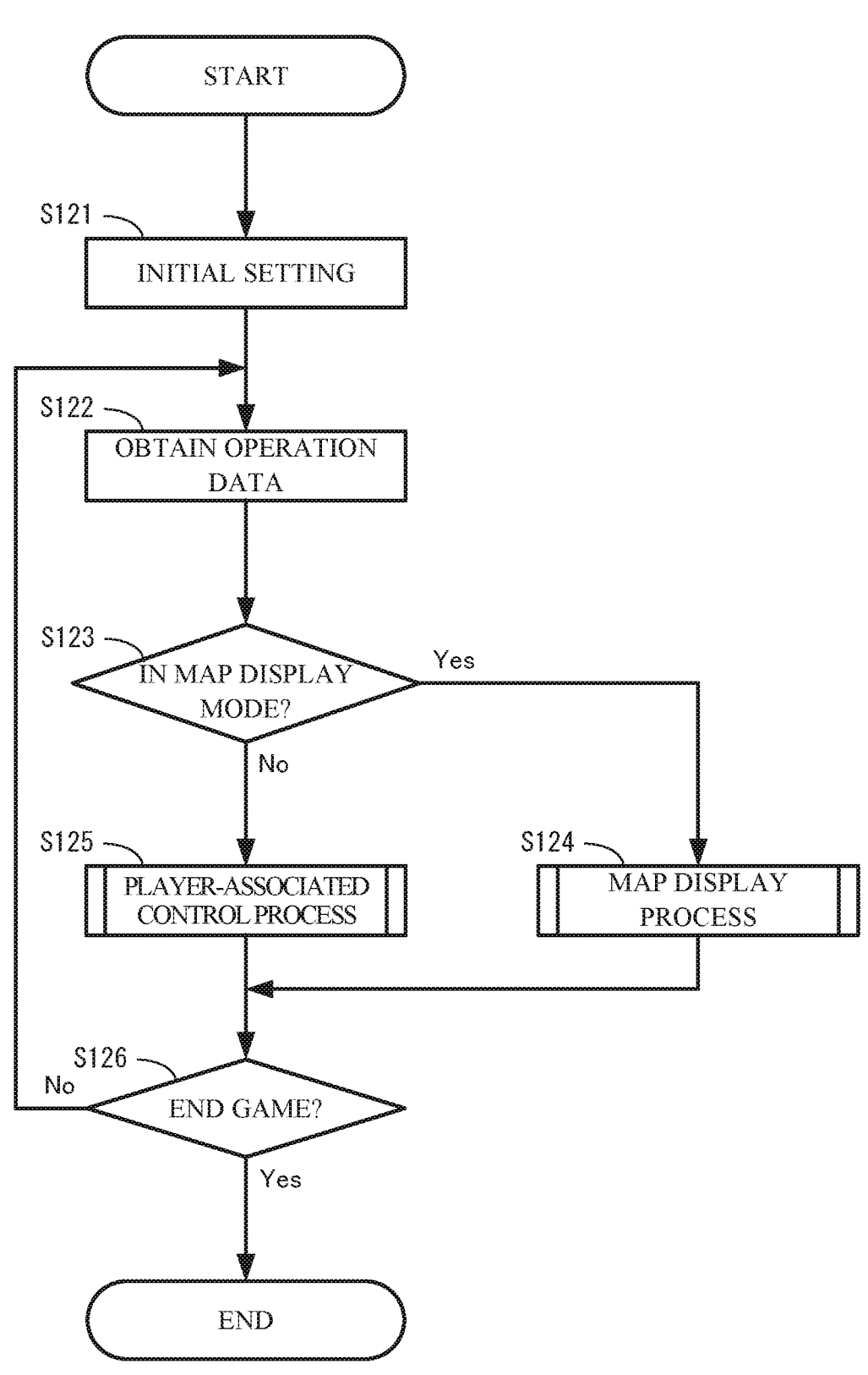

F I G. 2 1
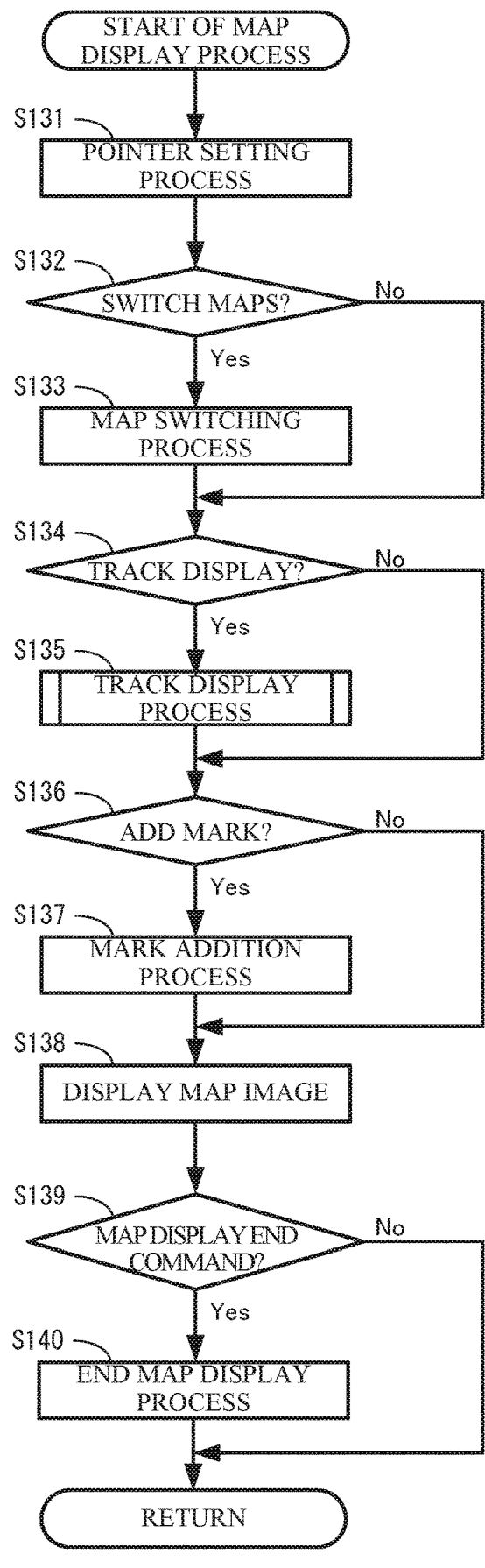

F I G.  2 2
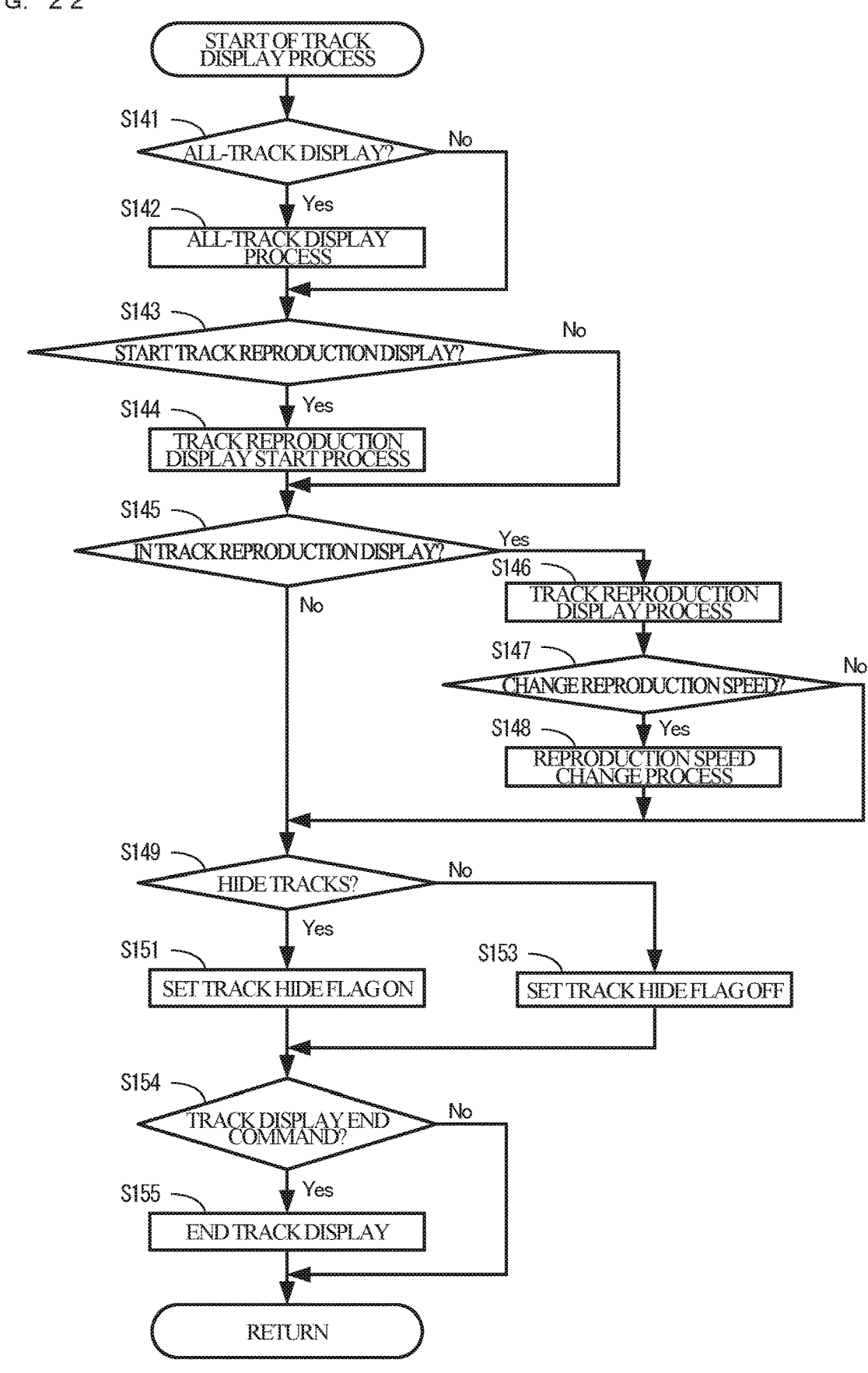

1

STORAGE MEDIUM, GAME SYSTEM, GAME APPARATUS, AND GAME PROCESSING METHOD

CROSS REFERENCE TO RELATED APPLICATION

This application claims priority to Japanese Patent Application No. 2023-14132, filed on Feb. 1, 2023, the entire contents of which are incorporated herein by reference.

FIELD

The technology disclosed herein relates to a storage medium, game system, game apparatus, and game processing method that execute a process of using a player character in a virtual space.

BACKGROUND AND SUMMARY

There has conventionally been a game program that controls a player character's action in a virtual space according to a user's operation input. In such a game program, a map image of an entire field in a virtual space in which a player character is allowed to move can be displayed, and a path along which the player character has moved in the virtual space until the current time can be displayed.

However, the above game program has a problem of how to display a player character's tracks based on movement records in a map image in the case in which the map image has a plurality of layers corresponding to heights in a virtual space.

With the above in mind, it is an object of the present example to provide a storage medium, game system, game apparatus, and game processing method that are capable of displaying, in a map image, a player character's tracks based on movement records in a virtual space in the case in which the map image has a plurality of layers corresponding to heights in the virtual space.

To achieve the object, the present example may have features (1) to (10) below, for example.

(1) An example configuration of a non-transitory computer-readable storage medium of the present example has stored therein instructions that, when executed, cause a computer of an information processing apparatus to execute game processing comprising: executing a game process of controlling movement of at least a player character in a virtual space based on a user's operation input, and storing time-series records of locations of the player character from the start of a game into a storage medium: displaying one of a plurality of layers corresponding to heights in the virtual space in a map image having the plurality of layers according to a first command based on the user's operation input, wherein the map image shows field information in the virtual space; and executing track display according to a second command based on the user's operation input when the map image is being displayed, wherein the player character's tracks based on the records are displayed, overlaying the map image of the layer being displayed, and a portion of the tracks based on the records at the height corresponding to the layer being displayed are displayed in a display form different from that of portions of the tracks based on the records at the heights corresponding to the layers other than the layer being displayed.

2

With the configuration of (1), when tracks based on records of a player character in a virtual space are displayed, overlapping a map image, display can be performed for a map image having a plurality of layers corresponding to heights in the virtual space.

(2) In the configuration of (1), the game processing may further comprise: when the map image is being displayed or when the track display is being executed, switching the layers of the map image according to a third command to choose one of the layers based on the user's operation input.

With the configuration of (2), the layers of the map image can be switched for display. When the switching is performed, tracks based on records can be displayed in a display form corresponding to the displayed layer after the switching.

(3) In the configuration of (2), when the track display is being executed, a portion of the tracks based on the records at the height corresponding to the layer being displayed may be displayed in a line having a first thickness, and portions of the tracks based on the records at the heights corresponding to the layers other than the layer being displayed may be displayed in a line having a second thickness smaller than the first thickness.

With the configuration of (3), the player character's tracks at a height corresponding to the displayed layer of the map image being displayed can be displayed in a manner that allows those tracks to be more easily recognized than tracks in the other layers.

(4) In the configuration of any one of (1) to (3), as the track display, all-track display may be executed in which all of the tracks from the start of the game until a most recent one of the records, or all of the tracks based on a period of time's worth of the records, are displayed, overlaying the map image.

With the configuration of (4), all tracks based on records of the player character can be displayed at once, overlaying the map image.

(5) In the configuration of any one of (1) to (4), as the track display, track reproduction display may be executed in which the tracks are updated with time and are displayed, overlaying the map image, in time order from the start of the game or from a time point before a period of time from a most recent one of the records.

With the configuration of (5), the player character's time-varying tracks can be displayed, overlaying the map image.

(6) In the configuration of (5), the game processing may further comprise: when the map image is being displayed and when the track display is being executed, displaying a layer indication image showing the layers that are allowed to be chosen and displayed and the layer being displayed; and during the track reproduction display, additionally displaying an icon image at a location in the layer indication image that shows the layer corresponding to a most recently updated portion of the tracks that are updated with time.

With the configuration of (6), when time-varying tracks are displayed while the layers of the map image are switched for display, the tracks can be displayed in a manner that allows the height corresponding to the layer of a most recent portion of the tracks to be easily recognized.

(7) In the configuration of any one of (4) to (6), the game processing may further comprise: during the track display, switching between display and undisplay of portions of the tracks based on the records at the heights corresponding to the layers other than the layer being displayed, according to a fourth command based on the user's operation input.

With the configuration of (7), only tracks at a height corresponding to the layer of the map image that is to be displayed can be chosen to be displayed, and therefore, the tracks can be displayed in a more recognizable manner.

(8) In the configuration of any one of (1) to (7), the game processing may further comprise: when the map image is being displayed and when the track display is being executed, additionally disposing and displaying a mark image at a designated location in the map image of the layer being displayed, according to a fifth command based on the user's operation input.

With the configuration of (8), a location that the user desires to store can be designated in the map image.

(9) In the configuration of any one of (1) to (8), the virtual space may include at least a ground field and an airspace field. The map image may include at least a ground map image of the layer indicating the ground field and an airspace map image of the layer indicating the airspace field.

With the configuration of (9), in a virtual space in which an airspace field and a ground field are set, when the player character continuously travels between the fields, track overlaying display is effective for a map image having a plurality of layers corresponding to heights in the virtual space.

(10) In the configuration of (9), the virtual space further may include an underground field. The map image may further include an underground map image of the layer indicating the underground field.

With the configuration of (10), the map image showing an underground field in addition to an airspace field and a ground field can be displayed. In addition, in the case in which a ground surface blocks travel between the ground field and the underground field, and an association element for allowing travel between these fields is set, a destination of a player character can be considered by seeing the player character's tracks.

In addition, the present example may be carried out in the forms of a game system, game apparatus, and game processing method.

According to the present example, in the case in which tracks based on records of a player character in a virtual space are displayed, overlapping a map image, display can be performed for a map image having a plurality of layers corresponding to heights in the virtual space.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 1 is a diagram illustrating a non-limiting example of a state in which a left controller 3 and a right controller 4 are attached to a main body apparatus 2, FIG. 2 is a diagram illustrating a non-limiting example of a state in which a left controller 3 and a right controller 4 are detached from a main body apparatus 2, FIG. 4 illustrates six orthogonal views of a non-limiting example of a left controller 3, FIG. 5 illustrates six orthogonal views of a non-limiting example of a right controller 4, FIG. 6 is a block diagram illustrating a non-limiting example of an internal configuration of a main body apparatus 2, FIG. 7 is a block diagram illustrating non-limiting examples of internal configurations of a main body apparatus 2, a left controller 3, and a right controller 4, FIG. 8 is a diagram illustrating a non-limiting example of a field image in which a player character PC is disposed in a field of a virtual space, FIG. 9 is a diagram illustrating a non-limiting example of a ground map image, FIG. 11 is a diagram illustrating a non-limiting example of an underground map image, FIG. 12 is a diagram illustrating a non-limiting example of a relationship between a player character PC's movement tracks in each field and all-track display in which all the movement tracks are displayed, overlaying a map image that is being displayed, FIG. 14 is a diagram illustrating a non-limiting example of all-track display in which all movement tracks of a player character PC are displayed, overlaying an underground map image, FIG. 15 is a diagram illustrating a non-limiting example of track reproduction display in which a player character PC's movement tracks are reproduced and displayed in a ground map image, FIG. 16 is a diagram illustrating a non-limiting example of track reproduction display in which a player character PC's movement tracks are reproduced and displayed in a ground map image, FIG. 17 is a diagram illustrating a non-limiting example of track display in which a portion of a player character PC's movement tracks are hidden in a ground map image, FIG. 18 is a diagram illustrating a non-limiting example in which a mark image is added and disposed in an underground map image, FIG. 20 is a flowchart illustrating a non-limiting example of a game process that is executed in a game system 1, FIG. 21 is a subroutine illustrating a non-limiting example of a map display process of step S124 in FIG. 20, FIG. 22 is a subroutine illustrating a non-limiting example of a track display process of step S135 in FIG. 21.

DETAILED DESCRIPTION OF NON-LIMITING EXAMPLE EMBODIMENTS

Figure 3:
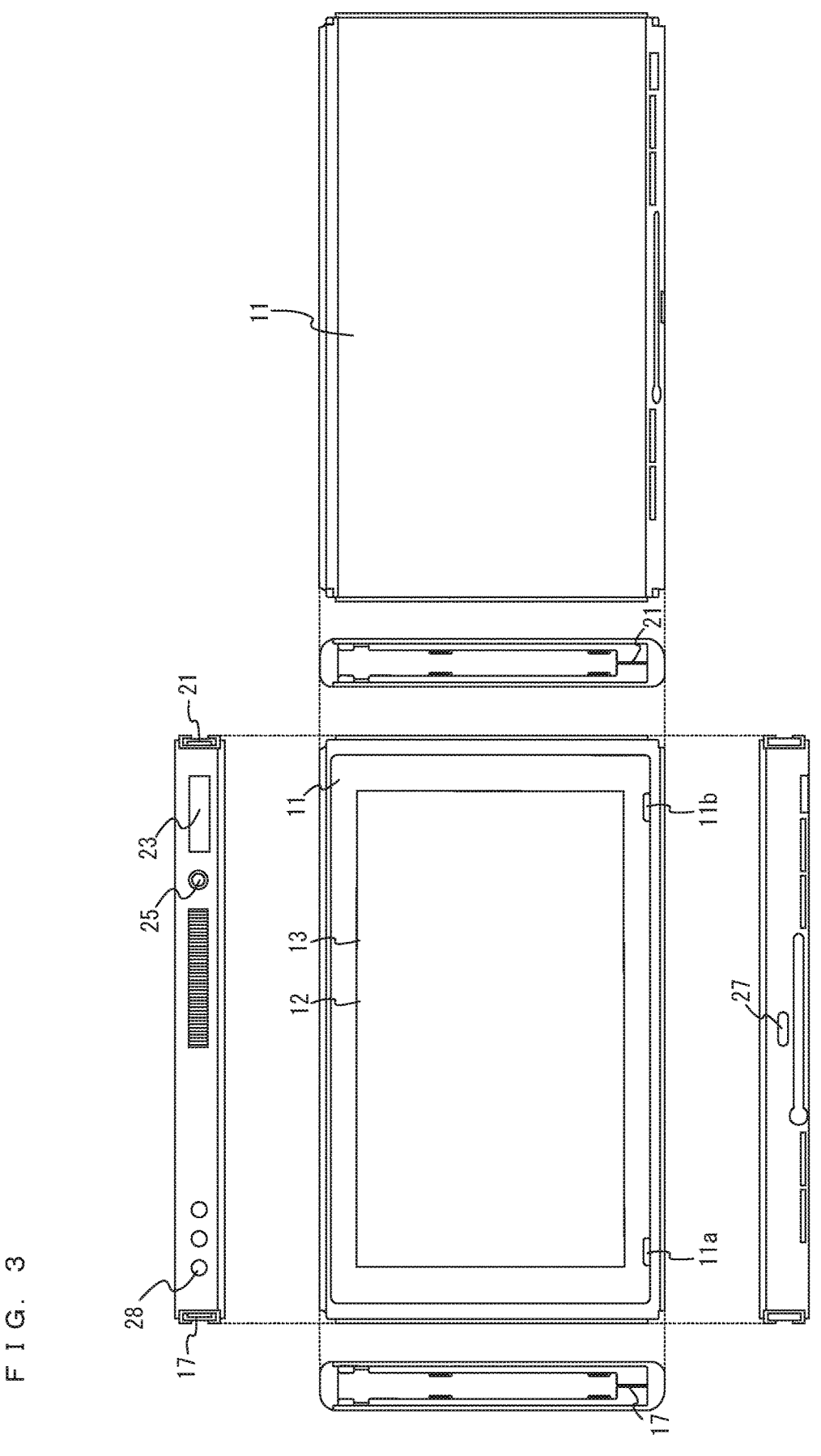
FIG. 3 illustrates six orthogonal views of a non-limiting example of a main body apparatus 2.

A game system according to the present example will now be described. An example of a game system 1 according to the present example includes a main body apparatus (information processing apparatus serving as the main body of a game apparatus in the present example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the following description, a hardware configuration of the game system 1 of the present example is described, and thereafter, the control of the game system 1 of the present example is described.

FIG. 1 is a diagram illustrating an example of a state in which the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

FIG. 2 is a diagram illustrating an example of a state in which each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

FIG. 3 illustrates six orthogonal views of an example of the main body apparatus 2. As illustrated in FIG. 3, the main body apparatus 2 includes an approximately plate-shaped housing 11. In the present example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present example, the display 12 is a liquid crystal display device (LCD). The display 12, however, may be a display device of any suitable type.

In addition, the main body apparatus 2 includes a touch panel 13 on the screen of the display 12. In the present example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11a and 11b are formed in the main surface of the housing 11. The speaker 88 outputs sounds through the speaker holes 11a and 11b.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present example, the cradle has the function of charging the unified apparatus or the main body apparatus 2 alone, being placed thereon. The cradle also functions as a hub device (specifically, a USB hub).

FIG. 4 illustrates six orthogonal views of an example of the left controller 3. As illustrated in FIG. 4, the left controller 3 includes a housing 31. In the present example, the housing 31 has a vertically long shape, e.g., is shaped to be long in an up-down direction (i.e., a y-axis direction illustrated in FIGS. 1 and 4). In the state in which the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give commands depending on various programs (e.g., an OS program and an application program) executed by the main body apparatus 2.

The left controller 3 also includes a terminal 42 that enables wired communication between the left controller 3 and the main body apparatus 2.

FIG. 5 illustrates six orthogonal views of an example of the right controller 4. As illustrated in FIG. 5, the right controller 4 includes a housing 51. In the present example, the housing 51 has a vertically long shape, e.g., is shaped to be long in the up-down direction. In the state in which the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

FIG. 6 is a block diagram illustrating an example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication", in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As an example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

FIG. 7 is a block diagram illustrating examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 obtains information regarding an input (specifically, information regarding an operation or the detection result of the sensor) from each of input sections (specifically, the buttons 103 and the analog stick 32). The communication control section 101 transmits operation data including the obtained information (or information obtained by performing predetermined processing on the obtained information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to an embodiment in which an image is displayed on the display 12. It should be noted that in the case in which the game system 1 is used in an embodiment in which an image is displayed on the display 12, the game system 1 may be used with the left controller 3 and the right controller 4 attached to the main body apparatus 2 (e.g., the main body apparatus 2, the left controller 3, and the right controller 4 are integrated in a single housing).

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present example, as an example, a game can be played using a player character PC that performs an action in a virtual space according to the user's operation performed using the operation buttons, the sticks, and the touch panel 13.

Next, a game process that is executed in the game system 1 will be outlined with reference to FIGS. 8 to 18. In the present example, a player character PC's movement tracks in a virtual space are displayed on a map image with the movement tracks arranged in time order from the start of play. For example, when, in a map image having a plurality of layers corresponding to heights or height ranges in the virtual space, the map image of a first layer is displayed, the player character PC's movement tracks are displayed, overlaying the map image of the first layer, where a portion of the player character PC's movement tracks at the height corresponding to the first layer, and portions of the player character PC's movement tracks at heights corresponding to layers other than the first layer, are displayed in different display forms.

In the present example, the game system 1 executes a game in which a player character PC that can be operated by the user moves in a game field (hereinafter simply referred to as a "field") that is a three-dimensional virtual space. The game system 1 can display a field image showing a field in which a player character PC is disposed, and in addition, a map image showing a map of the field. In the present example, the map image may be displayed, replacing the field image, according to the user's command, or at least a portion of the map image may always be displayed together with the field image.

FIG. 8 illustrates an example of a field image in which a player character PC is disposed in a field of a virtual space. The player character PC can be operated by the user of the game system 1, and can move in a field of the virtual space according to the user's operation input.

In the present example, a plurality of fields are set, corresponding to respective layers corresponding to heights in the virtual space. In the following description, for the sake of convenience, a field corresponding to a layer of at least a predetermined height in the virtual space is referred to as an airspace field, a field corresponding to a layer between a ground and the predetermined height (not inclusive) in the virtual space is referred to as a ground field, and a field corresponding to a layer under the ground is referred to as an underground field.

The field image of FIG. 8 shows that the player character PC is disposed on the ground of the ground field. For example, the player character PC can move on the ground in the ground field and perform a predetermined action on the ground based on the user's operation input.

The player character PC can move upward from the ground of the ground field based on the user's operation input. For example, the player character PC can jump up from the ground of the ground field and fly in the air based on the user's operation input. By moving upward from the ground of the ground field to the airspace field, the player character PC can change layers from the ground field to the airspace field (e.g., an airspace), and can move in the airspace field. The player character PC can also move downward toward the ground field from the state of flying in the air, based on the user's operation input. By moving downward from the airspace field to the ground field, the player character PC can change layers from the airspace field to the ground field, and can move in the ground field.

The player character PC can also move downward from the ground of the ground field based on the user's operation input. For example, a specific site from which the player character PC can move underground in the virtual space is provided in the ground field. The player character PC can move underground from the ground field through the specific site based on the user's operation input. By moving downward from the ground field to the underground field, the player character PC can change layers from the ground field to the underground field (e.g., under the ground), and can move in the underground field. The player character PC can also move upward toward the ground field from the state of moving in the underground field, i.e., under the ground, based on the user's operation input. By moving upward from the underground field to the ground field, the player character PC can change layers from the underground field to the ground field, and can move in the ground field.

Thus, the player character PC in the present example can at least move in the ground field, airspace field, and underground field in the virtual space based on the user's movement operation. It should be noted that the ground field, airspace field, and underground field may not actually be demarcated in the virtual space.

Figure 10:
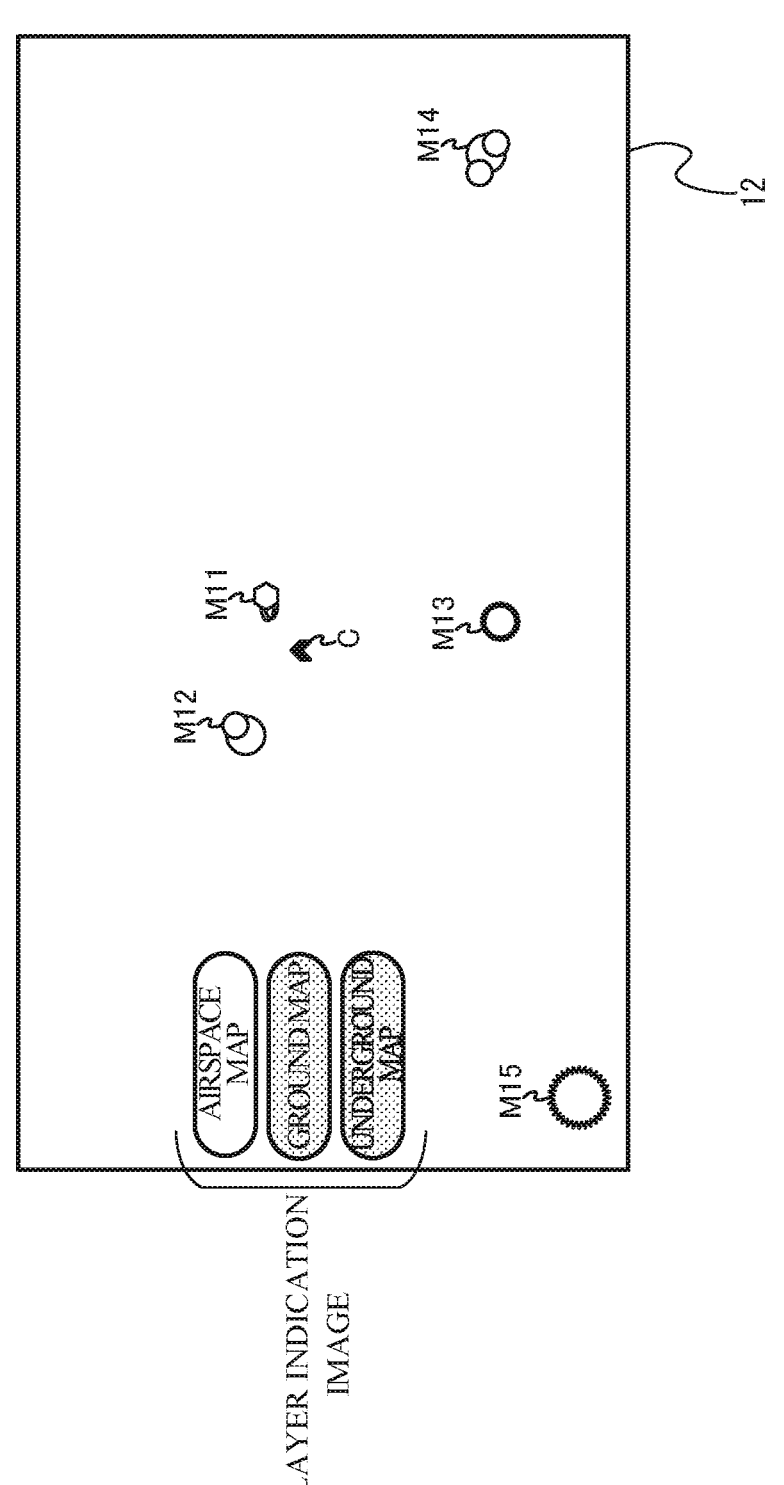
FIG. 10 is a diagram illustrating a non-limiting example of an airspace map image.

Next, a map image used in the present example will be described with reference to FIGS. 9 to 11. It should be noted that FIG. 9 is a diagram illustrating an example of a ground map image. FIG. 10 is a diagram illustrating an example of an airspace map image. FIG. 11 is a diagram illustrating an example of an underground map image.

In the present example, the display mode can be switched according to the user's operation input between a field mode in which a field image showing that the player character PC is disposed in any of the fields in the virtual space is displayed (see FIG. 8) and a map display mode in which a map image is displayed. As an example, in the present example, the map display mode is chosen according to a mode change operation input (e.g., an operation input of pressing down the operation button 47 (minus button)) performed in the field mode. In the map display mode, any of a ground map image showing a map of all or a portion of the ground field, an airspace map image showing a map of all or a portion of the airspace field, and an underground map image showing a map of all or a portion of the underground field can be chosen and displayed according to the user's operation input. In the present example, the display range of a map image that is being displayed can be changed according to a display range change operation input (e.g., an operation input for scrolling a screen by an operation of tilting the left stick 32, or an operation input for enlarging/reducing a screen by an operation of tilting the right stick 52) performed in the state in which the map image is being displayed. It should be noted that the user's commands based on the mode change operation input and/or the display range change operation input correspond to an example of a first command based on the user's operation input.

In an example of a ground map image illustrated in FIG. 9, a map of the ground field in the virtual space is displayed. In the entire ground map image, detailed field information of the ground field is described. For example, the field information is related to a field in the virtual space, including information about a terrain forming the field (specifically, a shape and the like of the terrain), information about an object provided in the field, information about a character present in the field, and the like. The field information described in a ground map image includes terrain information such as the names, shapes, contour lines, and the like of seas, lakes, ponds, rivers, mountains, hills, forests, plains, and the like of the ground field (e.g., the ground), building/construction information such as the names, shapes, locations, and the like of roads, bridges, built structures, and the like provided in the ground field, and the like. As an example, in the ground map image of FIG. 9, roads and built structures M1 to M10 built in the ground field are described, indicating the shapes, types, locations, and the like thereof. In addition, in the ground map image, a current location C where the player character PC is currently located in the ground field is displayed.

In addition, the fields of the map image are switched to display one of the fields according to the user's operation input for switching the fields of the map image to display one of the fields (e.g., a map switching operation input of pressing down an operation button 35 (up button) or an operation button 34 (down button) of the left controller 3). For example, a displayed map image includes a layer indication image showing the layers (fields) of the map image that can be chosen and displayed, and the layer (field) of the map image that is being displayed. As an example, in the layer indication image of the ground map image of FIG. 9, the map name "ground map" displayed in an open region indicates that the map image that is being displayed is of a map of the layer corresponding to the ground field, and the map image of the layer that is being displayed can be switched to the map image of the layers corresponding to the other fields (an airspace map and an underground map). It should be noted that, in the layer indication image, the layers (fields) may be indicated by character information or an image such as an icon. In addition, the user's command based on the map switching operation input corresponds to another example of the first command based on the user's operation input.

In an example of an airspace map image illustrated in FIG. 10, a map of the airspace field in the virtual space is displayed, and detailed field information of the airspace field is described throughout the airspace map image. For example, the field information described in the airspace map image includes information such as the names, shapes, locations, and the like of airspace field objects floating in the airspace field (e.g., an airspace), and the like. As an example, in the airspace map image of FIG. 10, airspace field objects M11 to M15 floating in the airspace field are described, indicating the shapes, types, locations, and the like thereof. In addition, a current location C where the player character PC is currently located in the airspace field is shown in the airspace map image. In the layer indication image of the airspace map image, the map name "airspace map" displayed in an open region indicates that the map image that is being displayed is of a map of the layer corresponding to the airspace field, and the map image of the layer that is being displayed can be switched to the map image of the layers corresponding to the other fields (a ground map and an underground map).

In an example of an underground map image illustrated in FIG. 11, a map of the underground field in the virtual space is displayed, and detailed field information of the underground field is described throughout the underground map image. For example, the field information described in the underground map image includes terrain information such as the names, shapes, contour lines, and the like of seas, lakes, ponds, rivers, mountains, hills, forests, plains, and the like of the underground field (e.g., under the ground), building/construction information such as the names, shapes, locations, and the like of roads, bridges, built structures, and the like provided in the underground field, and the like. As an example, in the underground map image of FIG. 11, terrains and built structures M20 to M23 built in the underground field are described, indicating the shapes, types, locations, and the like thereof. In addition, in the underground map image, a current location C where the player character PC is currently located in the underground field is displayed. In the layer indication image of the underground map image, the map name "underground map" displayed in an open region indicates that the map image that is being displayed is of a map of the layer corresponding to the underground field, and the map image of the layer that is being displayed can be switched to the map image of the layers corresponding to the other fields (an airspace map and a ground map).

It should be noted that in the map image of each layer, an area where field information thereof is locked and an area where field information thereof is unlocked may be set and displayed in different forms. For example, the map image of an area where field information thereof is locked is displayed without at least a portion of the field information being displayed compared to an area where field information thereof is unlocked. In addition, when the player character PC performs a predetermined action at a specific location in the virtual space, the field information of the map image in an area around the specific location may be unlocked, and the map image in which the unlocked field information is described in the area may be able to be displayed.

Figure 13:
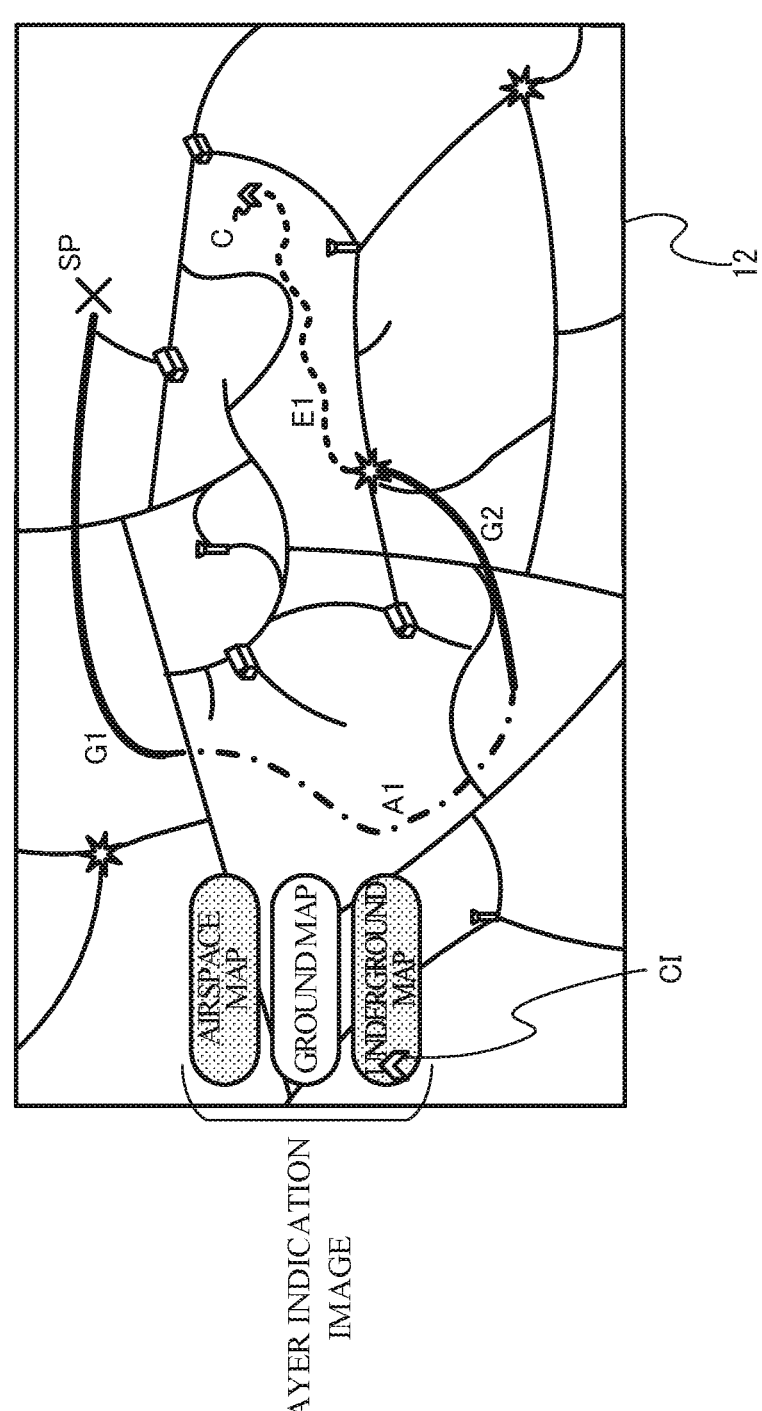
FIG. 13 is a diagram illustrating a non-limiting example of all-track display in which all movement tracks of a player character PC are displayed, overlaying a ground map image.

Next, track display in the present example will be described with reference to FIGS. 12 to 18. It should be noted that FIG. 12 is a diagram illustrating an example of a relationship between the player character PC's movement tracks in each field and all-track display in which all the movement tracks are displayed, overlaying the map image that is being displayed. FIG. 13 is a diagram illustrating an example of all-track display in which all movement tracks of the player character PC are displayed, overlaying a ground map image. FIG. 14 is a diagram illustrating an example of all-track display in which all movement tracks of the player character PC are displayed, overlaying an underground map image. FIGS. 15 and 16 are a diagram illustrating an example of track reproduction display in which the player character PC's movement tracks are reproduced and displayed in a ground map image. FIG. 17 is a diagram illustrating an example of track display in which a portion of the player character PC's movement tracks are hidden in a ground map image. FIG. 18 is a diagram illustrating an example in which a mark image is added and disposed in an underground map image.

In the present example, when the user's operation for performing track display (an operation of pressing down an operation button 55 (X-button)) is performed with the map image displayed in the map display mode, track display is performed in which the player character PC's movement tracks are displayed, overlaying the map image. In addition, the user's command based on the operation for performing track display corresponds to an example of a second command based on the user's operation input.

In the present example, a predetermined period of time's worth (e.g., the last 256 hours' worth) of time-series records of the locations of the player character PC during game play from the start of a game are stored in a storage medium. The records of the locations stored in the storage medium may be data indicating the three-dimensional locations of the player character PC in the virtual space, or data indicating a layer (field) in the virtual space and the two-dimensional location of the player character PC. In addition, the records of the locations may be stored into the storage medium on a frame-by-frame basis. where a frame is a cycle of a process executed in the game system 1 as described below, or may be stored into the storage medium in groups of several frames. In addition, when the records of the locations of the player character PC from the start of a game exceed the predetermined period of time's worth of records, relatively old records may be deleted so that the storage medium stores the predetermined period of time's worth of records.

In the present example, the player character PC's movement tracks in the virtual space based on the records are displayed, overlaying the map image of a field that is being displayed, according to the user's operation input for performing track display. When records of the player character PC's movement in a plurality of fields are stored, the player character PC's movement tracks in all the fields including a field that is being displayed and the other fields are displayed, overlaying the map image of the field that is being displayed. As an example, the movement tracks may be produced by linking line segments (straight lines or curves) having a predetermined display form that connect the locations of the player character PC that have been recorded on a frame-by-frame basis when the player character PC has moved in one or more frames, in time order. As another example, the movement tracks may be produced by disposing a point image having a predetermined display form at the locations of the player character PC that have been recorded on a frame-by-frame basis when the player character PC has moved in one or more frames, and linking the point images. The movement tracks may be produced by different methods.

For example, in an example illustrated in FIG. 12, records of the player character PC's movement from a movement start location SP in the ground field to a current location C in the underground field, which is the most recent movement record, are stored. Specifically, the player character PC moved in the ground field along movement tracks G1 from the movement start location SP in the ground field that is a game start point, and thereafter, moved from the ground field to the airspace field. Thereafter, the player character PC moved in the airspace field along movement tracks A1, and thereafter, moved from the airspace field to the ground field. Thereafter, the player character PC moved in the ground field again along movement tracks G2, and thereafter, moved from the ground field to the underground field. Thereafter, the player character PC moved in the underground field along movement tracks E1, and thereafter, reached the current location C in the underground field.

When such records of the player character PC are stored, all of the movement tracks G1 and G2 in the ground field, the movement tracks A1 in the airspace field, and the movement tracks E1 in the underground field are displayed, overlaying a game image that is being displayed (e.g., a ground map image of the ground field). In addition, in the game image that is being displayed, movement tracks in a portion based on the records of movement in a field that is being displayed and movement tracks in a portion based on the records of movement in the other fields are displayed in different display forms. For example, the display forms may be different from each other in at least one of parameters that are the thickness, color, line style, lightness, colorfulness, gray level, and transparency of movement tracks. In addition, the display forms may include one whose parameter changes with time, and one whose displayed state and hidden state are alternated with time. In addition, when a map image showing a plurality of fields other than a field that is being displayed is further set (i.e., a map image showing each of three or more fields (layers) is set), the player character PC's movement tracks in the plurality of fields may be displayed in the same display form or in different display forms. As a result, when movement tracks based on records are displayed, overlaying a map image, a map image corresponding to multiple layers can be displayed. In addition, when a map image showing each of three or more fields (layers) is set, movement tracks in a field that is being displayed as well as movement tracks in a plurality of other fields can be displayed in a manner that allows movement tracks in each field to be easily recognized.

It should be noted that compared to movement tracks in fields other than a field that is being displayed, movement tracks in the field that is being displayed may be displayed, overlaying a map image, in a more noticeable display form. As an example, movement tracks in a field that is being displayed may be displayed thicker than movement tracks in the other fields. As another example, movement tracks in a field that is being displayed may be displayed in an opaque solid line, and movement tracks in the other fields may be displayed in a solid or dashed line having a higher transparency (reduced opacity). As a result, the player character PC's movement tracks in a field in a map image that is being displayed can be displayed in a more recognizable way than movement tracks in the other fields.

It should be noted that in another example, movement tracks in a portion based on records of movement in a field that is being displayed may be put into a displayed state, and movement tracks in a portion based on records of movement in the other fields may be put into a hidden state, whereby these movement tracks may be displayed in different display forms.

In the present example, a plurality of track display modes can be chosen. For example, an all-track display mode in which all movement tracks are displayed, overlaying a map image, and a track reproduction display mode in which movement tracks are updated with time and are displayed, overlaying a map image, can be chosen. The display mode can be switched between the all-track display mode and the track reproduction display mode according to the user's operation input (e.g., a display mode switch operation input of pressing down the operation button 55 (X-button)). As an example, each time the display mode switch operation input is performed, the game system 1 sequentially switches between track hide (only a map image is displayed), all-track display, and track reproduction display. It should be noted that the display modes may be switched in any order, and a default display mode that is set when track display is started after a map image is displayed may be any of the all-track display mode and the track reproduction display mode.

In the all-track display mode, all movement tracks of the player character PC from the movement start location SP, at the time of start of a game, to the current location C, which is the most recent movement record, are displayed, overlaying a map image. For example, in an example illustrated in FIG. 13, in the all-track display mode, the player character PC's movement tracks based on movement records are displayed, overlaying a ground map image of the ground field. Specifically, the player character PC's movement tracks G1 and G2 in the ground field are displayed in a relatively thick solid line, the player character PC's movement tracks A1 in the airspace field are displayed in a dash-dot line that is thinner than that for the movement tracks G1 and G2, and the player character PC's movement tracks E1 in the underground field are displayed in a dashed line that is thinner than that for the movement tracks G1 and G2. Thus, the player character PC's movement tracks in a field that is being displayed are relatively noticeably displayed in a map image, and the player character PC's movement tracks in the other fields are displayed in a manner that allows those to be distinguished from the player character PC's movement tracks in the field that is being displayed. Therefore, the entire track display corresponding to a map image of multiple layers can be displayed in a manner that allows tracks in each layer to be easily recognized.

In addition, in the present example, in the all-track display mode, the fields of the map image can be switched to display one of the fields according to the user's operation input (e.g., the layer switch operation input of pressing down the operation button 35 (up button) or the operation button 34 (down button)). For example, also in the all-track display mode, the above layer indication image showing the layers (fields) of the map image that can be chosen and displayed, and the layer (field) of the map image that is being displayed, is displayed. FIG. 13 illustrates an example in which tracks are displayed in a ground map. Therefore, the layer indication image illustrated in FIG. 13 indicates, by an open region, that the map image that is being displayed is a ground map image, in which tracks are being displayed, and can be switched to the map image of the other fields (an airspace map and an underground map), in which tracks are to be displayed. In addition, in the all-track display mode, a current location icon image CI is displayed at a location in the layer indication image that shows a field in which the player character PC is currently disposed (i.e., the underground field, in which the current location C is located). It should be noted that the user's command based on the layer switch operation input in the all-track display mode corresponds to an example of a third command based on the user's operation input.

When the user performs the layer switch operation in the all-track display mode, the fields of the map image are switched so that the map image of a field corresponding to the layer switch operation is displayed, and all movement tracks of the player character PC from the movement start location SP to the current location C are displayed, overlaying the map image after the switching. For example, an example of all-track display illustrated in FIG. 14 indicates that a state in which all tracks are displayed in the ground map image of FIG. 13 has been switched to a state in which all tracks are displayed in an underground map image.

As illustrated in FIG. 14, in the all-track display mode, when the field of the map image has been switched to the underground field, the layer indication image indicates, by an open region, that the map image that is being displayed is an underground map image in which tracks are being displayed, and can be switched to the map image of the other fields (a ground map and an airspace map), in which tracks are to be displayed. In addition, the player character PC's movement tracks E1 in the underground field are displayed in a relatively thick solid line, the player character PC's movement tracks G1 and G2 in the ground field are displayed in a dashed line that is thinner than that for the movement tracks E1, and the player character PC's movement tracks A1 in the airspace field are displayed in a dash-dot line that is thinner than that for the movement tracks E1. Thus, in the all-track display mode, when the fields of the map image are switched to display one of the fields, the field of the map image after the switching is indicated by the layer indication image, and the display form of the player character PC's movement tracks in the field after the switching is changed such that the movement tracks are noticeably displayed.

In the track reproduction display mode, the player character PC's movement tracks are updated with time from the movement start location SP, at the time of start of a game, to the current location C, which is the most recent movement record, and are displayed, overlaying the map image, in time order. In other words, in the track reproduction display mode, the player character PC's movement tracks based on records are reproduced and displayed from the movement start location SP to the current location C in time order. For example, in an example illustrated in an upper portion of FIG. 15, in the track reproduction display mode, the player character PC's movement tracks based on movement records are reproduced and displayed from the movement start location SP to a halfway point in the movement tracks G1, overlaying a ground map image of the ground field. Specifically, the movement tracks G1 are reproduced with time from the movement start location SP according to time-series movements of the player character PC in the ground field (e.g., the movement tracks G1 are sequentially reproduced and extended from the movement start location SP in the direction indicated by an arrow m1 in FIG. 15). In addition, a reproduction location icon image LI is displayed at a leading end of movement tracks that are being reproduced. The reproduction location icon image LI is moved in the map image from the movement start location SP toward the current location C based on the player character PC's movement records, and the player character PC's movement tracks are reproduced and displayed, following the movement of the reproduction location icon image LI. It should be noted that the movement tracks G1 that are being reproduced and displayed are tracks of movement in the ground field of the map image that is being displayed, and therefore, are sequentially reproduced and displayed in a relatively thick solid line as in the all-track display mode.

Also in the track reproduction display mode, the above layer indication image is displayed which indicates the layers (fields) of the map image that can be chosen and displayed and the layer (field) of the map image that is being displayed. For example, the upper portion of FIG. 15 illustrates an example in which tracks are reproduced and displayed in a ground map. Therefore, the layer indication image illustrated in the upper portion of FIG. 15 indicates, by an open region, that the map image that is being displayed is a ground map image in which tracks are being reproduced and displayed, and can be switched to the map image of the other fields (an airspace map and an underground map), in which tracks are to be reproduced and displayed. In addition, in the track reproduction display mode, a current location icon image CI is displayed at a location in the layer indication image that shows a field in which the player character PC is currently disposed. In addition, in the track reproduction display mode, an in-reproduction layer icon image RI is displayed at a location in the layer indication image that shows a field that is being reproduced (i.e., the ground field in the state of the upper portion of FIG. 15).

In a lower portion of FIG. 15, in the track reproduction display mode, the player character PC's movement tracks based on movement records are reproduced and displayed from the movement start location SP to a halfway point in the movement tracks A1 of movement in the airspace field after movement along the movement tracks G1 in the ground field, overlaying a ground map image of the ground field. Specifically, after the movement tracks G1 in the ground field have been reproduced and displayed, the movement tracks A1 in the airspace field are reproduced with time (e.g., the movement tracks are sequentially reproduced and extended in the directions indicated by arrows m2 and m3), according to time-series movement records of the player character PC, which has moved from the ground field into the airspace field. In addition, a reproduction location icon image LI is displayed at a leading end of movement tracks that are being reproduced and displayed. It should be noted that the movement tracks A1 that are being reproduced and displayed are tracks of movement in the airspace field, which is different from the ground field of the map image that is being displayed, and therefore, are sequentially reproduced and displayed in a dash-dot line thinner than that for the movement tracks G1 as in the all-track display mode.

In addition, the lower portion of FIG. 15 indicates an example in which tracks are reproduced and displayed in a ground map as with the upper portion of FIG. 15. Therefore, the layer indication image illustrated in the lower portion of FIG. 15 also indicates, by an open region, that the map image that is being displayed is a ground map image in which tracks are being reproduced and displayed, and can be switched to the map image of the other fields (an airspace map and an underground map), in which tracks are to be reproduced and displayed. In addition, in the state of the lower portion of FIG. 15, movement tracks in the airspace field are being reproduced and displayed, and the in-reproduction layer icon image RI is displayed at a location in the layer indication image that shows the airspace field, in which tracks are being reproduced.

In an example illustrated in FIG. 16, in the track reproduction display mode, the player character PC's movement tracks based on movement records are reproduced and displayed, overlaying a ground map image of the ground field, including movement in the ground field along movement tracks G1 from the movement start location SP, movement in the airspace field along movement tracks A1, and movement in the ground field along the movement tracks G2, and subsequent movement in the underground field to a halfway point through the movement tracks E1. Specifically, the movement tracks G1 in the ground field, the movement tracks A1 in the airspace field, and the movement tracks G2 in the ground field are reproduced and displayed, and thereafter, the movement tracks E1 in the underground field are reproduced with time (e.g., the movement tracks are sequentially reproduced and extended in the directions indicated by arrows m4 and m5), according to time-series movement records of movement of the player character PC when the player character PC has moved from the ground field into the airspace field and thereafter has moved through the ground field again to the underground field. The reproduction location icon image LI is displayed at a leading end of movement tracks that are being reproduced. It should be noted that in the state of FIG. 16, the movement tracks G2, which has already been reproduced, are tracks after movement in the ground field of the map image that is being displayed, and therefore, are sequentially reproduced and displayed in a relatively thick solid line as in the all-track display mode. In addition, the movement tracks A1, which are being reproduced and displayed, are tracks of movement in the underground field, which is different from the ground field of the map image that is being displayed, and therefore, are sequentially reproduced and displayed in a thinner dashed line than that for the movement tracks G1 and G2 as in the all-track display mode.

In addition, FIG. 16 illustrates an example in which tracks are reproduced and displayed in a ground map as in the upper and lower portions of FIG. 15. Therefore, the layer indication image illustrated in FIG. 16 also indicates, by an open region, that the map image that is being displayed is a ground map image in which tracks are being reproduced and displayed, and can be switched to the map image of the other fields (an airspace map and an underground map), in which tracks are to be reproduced and displayed. In addition, in the state of FIG. 16, movement tracks in the underground field are being reproduced and displayed, and therefore, the in-reproduction layer icon image RI is displayed at a location in the layer indication image that shows the underground field, which is currently reproduced.

Thus, also, when tracks are displayed in the track reproduction display mode, the player character PC's movement tracks in a field that is being displayed in a map image are relatively noticeably displayed, and the player character PC's movement tracks in the other fields are displayed in a manner that allows those to be distinguished from the player character PC's movement tracks in the field that is being displayed. Therefore, tracks corresponding to a map image of multiple layers can be reproduced and displayed in a manner that allows tracks in each layer to be easily recognized.

It should be noted that in the present example, also in the track reproduction display mode, the fields of the map image can be switched to display one of the fields according to the user's operation input (e.g., the layer switch operation input of pressing down the operation button 35 (up button) or the operation button 34 (down button)). In the track reproduction display mode, when the user performs the layer switch operation, the layers are switched so that the map image of a field corresponding to the layer switch operation is displayed, and the player character PC's movement tracks from the movement start location SP to the current location C are reproduced and displayed, overlaying the map image after the switching. At this time, the display form in which movement tracks are reproduced and displayed is such that as in the all-track display mode, the player character PC's movement tracks in the field of the map image after the switching is relatively noticeably displayed, and the player character PC's movement tracks in the other fields are reproduced and displayed in a manner that allows those to be distinguished from the player character PC's movement tracks in the field after the switching. It should be noted that the user's command based on the layer switch operation input in the track reproduction display mode corresponds to the third command based on the user's operation input.

In addition, a reproduction speed at which movement tracks are sequentially reproduced and displayed in the track reproduction display mode may be able to be adjusted according to the user's operation input (e.g., a reproduction speed switch operation input of pressing down an operation button 38 (L-button) or an operation button 60 (R-button)). In addition, the reproduction speed at which movement tracks are sequentially reproduced and displayed in the track reproduction display mode may be changed, depending on a display scale factor of a map image that is being displayed. As an example, the reproduction speed may be reduced by zooming in, and increased by zooming out.

In addition, the process of sequentially reproducing and displaying movement tracks in the track reproduction display mode may be able to be switched between stop and restart of reproduction according to the user's operation input (e.g., a reproduction stop operation input of pressing down the operation button 55 (X-button)).

In addition, to movement tracks that are displayed in the all-track display mode and/or track reproduction mode, a label indicating the player character PC's action or state that occurs when the player character PC is moving along the movement tracks may be added. For example, a label indicating that the player character PC has performed a specific movement (a warp drive, movement to a specific space, or the like) in the virtual space, a label indicating that the player character PC has performed a specific action (a fight, obtaining an item, or the like), a label indicating that the player character PC is in a specific state (being dead, having recovered, etc.), or the like may be added to the movement tracks.

In addition, a portion of movement tracks displayed in the all-track display mode may be hidden according to the user's operation input (e.g., a display switch operation input operation of pressing down an operation button 56 (Y-button)). For example, when all movement tracks of the player character PC are displayed, overlaying the ground field of the map image, in the all-track display mode as illustrated in FIG. 13, movement tracks out of the ground field of the map image may be hidden according to the user's display switch operation input as illustrated in FIG. 17. For example, in an example illustrated in FIG. 17, the movement tracks A1 in the airspace field and the movement tracks E1 in the underground field are hidden according to the user's display switch operation input. In other words, in the example of FIG. 17, of all movement tracks of the player character PC, only the movement tracks G1 and G2 in the ground field of the map image are displayed, overlaying the map image. It should be noted that in the present example, the display form may be sequentially switched and set between a form in which a portion of all the movement tracks are hidden and a form in which the portion of all the movement tracks are displayed again each time the display switch operation input is performed. Thus, switching can be performed such that a portion of all movement tracks of the player character PC that are out of the field shown by the map image are hidden, instead of displaying all movement tracks of the player character PC. As a result, displays can be switched such that the player character PC's movement tracks in a layer shown by a map image can be easily recognized. It should be noted that the user's command based on the display switch operation input corresponds to an example of a fourth command based on the user's operation input.

It should be noted that display switching that causes a portion of movement tracks to be hidden may also be enabled in the track reproduction display mode. In that case, according to the user's display switch operation input, movement tracks out of the field shown by a map image are hidden, and movement tracks in the field shown by the map image are updated with time and are displayed, overlaying the map image, according to time-series movement records of the player character PC in the field shown by the map image.

In addition, existing information displayed in a map image (symbols, character information, and the like on a map) may also be hidden according to the user's display switch operation input. As an example, each time the display switch operation input is performed, the game system 1 sequentially switches the display form between a form in which the existing information is hidden, a form in which a portion of movement tracks are hidden, and a form in which the existing information and all movement tracks are displayed. It should be noted that the forms may be switched in any order.

In addition, movement tracks that are displayed, overlaying a map image, in the all-track display mode and the track reproduction display mode may not be based on records including from one at the time of start of a game to the most recent one, and may be based on a predetermined period of time's worth of records. Here, the predetermined period of time may be shorter than the period of time ranging from the time of start of a game to the time of the most recent record, or may be a preset maximum time for which a storage medium can store as many records of the locations of the player character PC as possible, a period of time specified by the user, or a period of time that is set by the game system 1, as appropriate, depending on the environment or progression of a game.

In addition, in the present example, a mark image P may be able to be additionally displayed at a specified location in a map image according to the user's operation input (e.g., a mark disposition operation input of pressing down an operation button 53 (A-button)). For example, the mark image P is for continuing to designate a specific location in a map image that the user desires to record, and is an image of a map pin, a stamp, or the like. As an example, as illustrated in FIG. 18, when the mark disposition operation input is performed in the all-track display mode or the track reproduction display mode with the player character PC's movement tracks displayed, overlaying a map image, a mark image P1 having the shape of a pin is additionally displayed at a location in the map image designated by a pointer Q or the like. Here, when a map image in which tracks are not displayed is being displayed or when movement tracks are being displayed, overlaying a map image, the pointer Q is moved in the map image that is being displayed based on the user's operation input (e.g., a pointer movement operation input of tilting the left stick 32). Therefore, by moving the pointer Q when a map image is being displayed, the user can designate any location in the map image as a location where the mark image P is added. It should be noted that the mark image P can be added and stored not only in a map image in which tracks are not displayed but also in a map image in which overlaying movement tracks are displayed. When the map image is displayed after the addition, the displaying of the mark image P in the map image is maintained.

In addition, in the present example, the player character PC can move in the three layers of fields, i.e., the ground field, airspace field, and underground field, in the virtual space. Here, the airspace field and the ground field are layers that allow the player character PC to continuously travel between these fields. The present example is effective when movement tracks extending from one layer to another layer are displayed. In addition, in most cases, the ground surface typically blocks travel between the ground field and the underground field. In the case in which an association element for allowing travel between these fields is set, a destination can be considered by seeing the player character PC's movement tracks, which is suitable for use of such a field configuration.

It should be noted that fields in the virtual space in which the player character PC can move are not limited to the above ground field, airspace field, and underground field, and the player character PC may be able to move in a plurality of layers of fields having different forms. For example, in the case in which the player character PC can move in a three layers of fields, the three layers of fields may not be the above ground field, airspace field, and underground field, and may be two layers of airspace fields including a lower airspace field and a higher airspace field, and a ground field. In the case in which a map image showing three or more layers of fields is set, different display forms of the player character PC's movement tracks and switching of fields displayed in the map image are particularly effective.

In addition, the present example is not limited to an embodiment in which the player character PC can move in three layers of fields, and the player character PC may be able to move in four or more layers of fields or two layers of fields. In an embodiment in which the player character PC can move in two layers of fields, a map image may be set which indicates each of any two chosen from the above ground field, airspace field, and underground field. In addition, fields in the virtual space in which the player character PC can move may include a field having a form different from those of the above ground field, airspace field, and underground field. As a first example, the ground field in the present example may include a sea surface field that is an area of a sea surface. The player character PC may be able to move in two or more layers of fields including the sea surface field and the airspace field. As a second example, the airspace field in the present example may include outer space (the area beyond the Earth's atmosphere) in the virtual space. The player character PC may be able to move two or more layers of fields including the ground field and the airspace field including outer space. As a third example, the player character PC may be able to move in at least an undersea field that is an area below a sea surface and a sea surface field that is an area of a sea surface in the virtual space. Thus, even in a game using a map image showing fields having various forms, the map image can be displayed and movement tracks can be displayed, overlaying the map image, in a manner similar to that described above.

Figure 19:
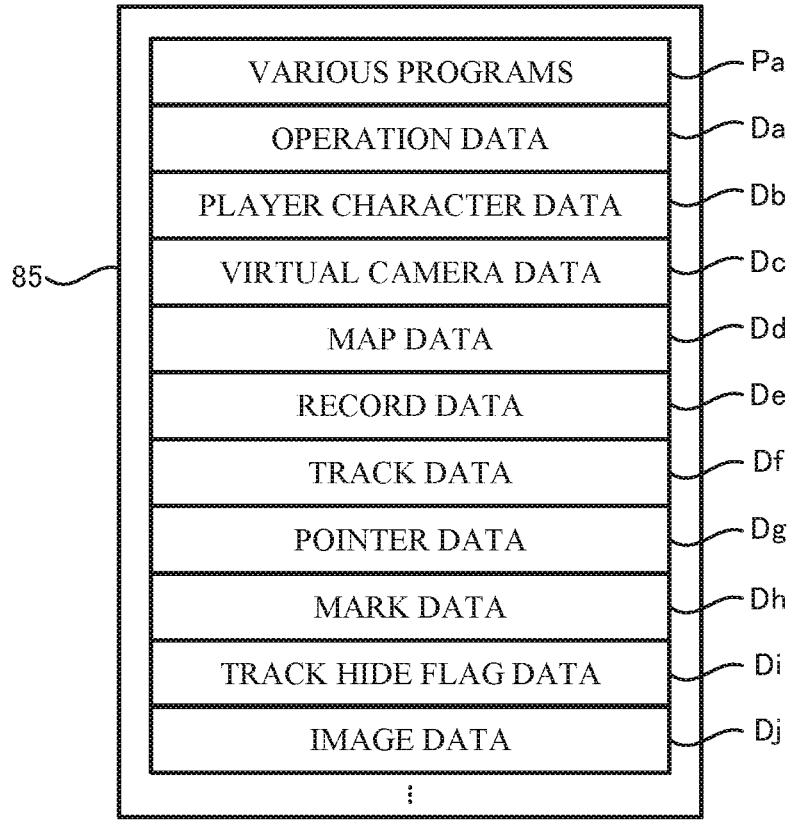
FIG. 19 is a diagram illustrating a non-limiting example of a data area set in a DRAM 85 of a main body apparatus 2.

Next, an example of a specific process that is executed in the game system 1 will be described with reference to FIG. 19. FIG. 19 is a diagram illustrating an example of a data area set in the DRAM 85 of the main body apparatus 2. It should be noted that in addition to the data of FIG. 19, the DRAM 85 also stores data used in other processes, which will not be described in detail.

Various programs Pa that are executed in the game system 1 are stored in a program storage area of the DRAM 85. In the present example, the programs Pa include an application program (e.g., a game program) for performing information processing based on data obtained from the left controller 3 and/or the right controller 4 and the main body apparatus 2, and the like. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

In addition, the data storage area of the DRAM 85 stores various kinds of data that are used in processes that are executed in the game system 1 such as information processes. In the present example, the DRAM 85 stores operation data Da, player character data Db, virtual camera data Dc, map data Dd, record data De, track data Df, pointer data Dg, mark data Dh, track hide flag data Di, image data Dj, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each operation button, an analog stick, or a touch panel) (specifically, information about an operation). In the present example, operation data is obtained from each of the left controller 3 and/or the right controller 4 and the main body apparatus 2. The obtained operation data is used to update the operation data Da as appropriate. It should be noted that the operation data Da may be updated for each frame that is the cycle of a process executed in the game system 1, or may be updated each time operation data is obtained.

The player character data Db indicates the location, direction, and pose, and an action and state in the virtual space, of the player character PC located in the virtual space, and the like.

The virtual camera data Dc indicates the location, direction, angle of view, and the like of a virtual camera disposed in the virtual space.

The map data Dd indicates a map image having a plurality of fields (a ground field, an airspace field, and an underground field) corresponding to heights in the virtual space.

The record data De indicates a predetermined period of time's worth of time-series records of locations of the player character PC from the start of a game.

The track data Df indicates the player character PC's movement tracks that are displayed, overlaying a map image. It should be noted that data indicating movement tracks may be a group of three-dimensional coordinates in the virtual space, or a group of combinations of information indicating a layer (field) in the virtual space and two-dimensional coordinates.

The pointer data Dg indicates the location of the pointer Q that is displayed in a map image.

The mark data Dh indicates the type and location of the mark image P that is disposed in a map image.

The track hide flag data Di indicates the track hide flag that is set on when a portion of movement tracks are hidden.

The image data Dj is for displaying an image (e.g., an image of the player character PC, an image of another character, an image of a virtual object, an image of a field of the virtual space, a map image, an image of movement tracks, and a background image) on a display screen (e.g., the display 12 of the main body apparatus 2).

Figure 23:
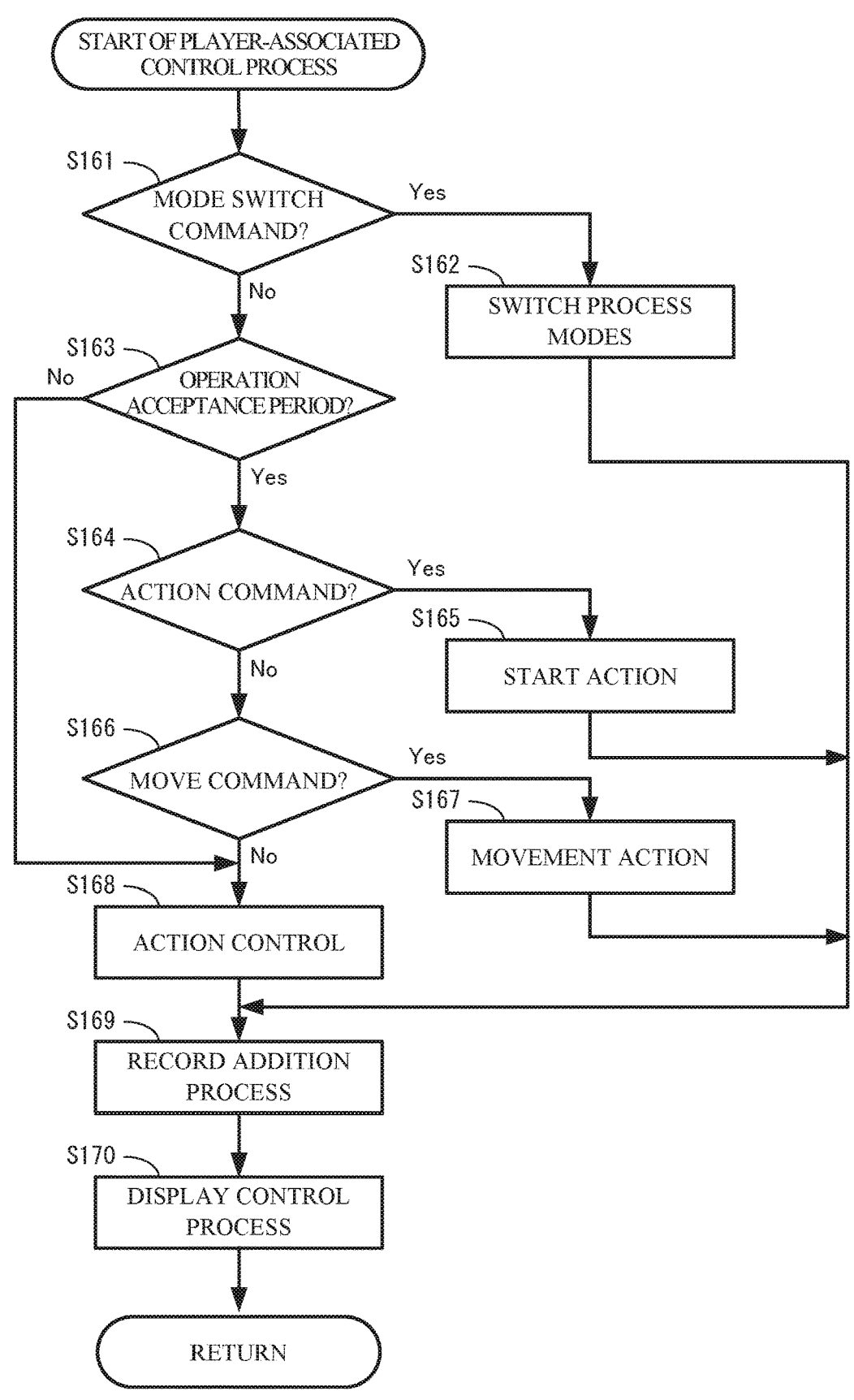
FIG. 23 is a subroutine illustrating a non-limiting example of a player-associated control process of step S125 in FIG. 20.

Next, a detailed example of a game process that is an example of an information process in the present example will be described with reference to FIGS. 20 to 23. FIG. 20 is a flowchart illustrating an example of a game process that is executed in the game system 1. FIG. 21 is a subroutine illustrating an example of a map display process of step S124 in FIG. 20. FIG. 22 is a subroutine illustrating an example of a track display process of step S135 in FIG. 21. FIG. 23 is a subroutine illustrating an example of a player-associated control process of step S125 in FIG. 20. In the present example, a series of steps illustrated in FIGS. 20 to 23 are executed by the processor 81 executing a predetermined application program (game program) included in the programs Pa. The game process of FIGS. 20 to 23 is started with any appropriate timing.

It should be noted that the steps in the flowcharts of FIGS. 20 to 23, which are merely illustrative, may be executed in a different order, or another step may be executed in addition to (or instead of) each step, if a similar effect is obtained. In the present example, it is assumed that the processor 81 executes each step of the flowcharts. Alternatively, a portion of the steps of the flowcharts may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 20 to 23 may be executed by a plurality of information processing apparatuses including the main body apparatus 2 cooperating with each other.

In FIG. 20, the processor 81 executes initial setting for the game process (step S121), and proceeds to the next step. For example, in the initial setting, the processor 81 initializes parameters for executing steps described below, and updates each data. As an example, the processor 81 disposes virtual objects, other characters, and the like in the ground field, airspace field, and underground field of the virtual space to generate an initial state of the virtual space. Thereafter, the processor 81 disposes the player character PC and the virtual camera in a predetermined pose and orientation at initial locations in the virtual space (e.g., default locations in the virtual space in the initial state at the time of start of a game, and locations before a game is paused, based on saved data or the like, when the game is restarted from a halfway point), and updates the player character data Db and the virtual camera data Dc. In addition, the processor 81 adds a record of the current location of the player character PC as the most recent record to the record data De.

Next, the processor 81 obtains operation data from the left controller 3, the right controller 4, and/or the main body apparatus 2, updates the operation data Da (step S122), and proceeds to the next step.

Next, the processor 81 determines whether or not the processor 81 is currently in the map display mode in which a map image is displayed (step S123). In the present example, when the user performs a map display operation input in the field mode in which a field image is displayed, the map display mode is started (see step S162 described below). If the processor 81 is currently in the map display mode, the processor 81 proceeds to step S124. Otherwise, i.e., if the processor 81 is not currently in the map display mode, the processor 81 proceeds to step S125.

In step S124, the processor 81 executes a map display process of displaying a map image on the display 12, and proceeds to step S130. The map display process of step S124 will be described below with reference to FIG. 21.

In FIG. 21, the processor 81 executes a process of setting the pointer Q that is displayed (step S131), and proceeds to the next step. For example, when an operation input of moving the pointer Q (e.g., the pointer movement operation input of tilting the left stick 32) has not been performed, the processor 81 sets the pointer data Dg such that the pointer Q is disposed at a default location, and displays, on the display 12, a map image that the pointer Q overlays at the default location. In addition, if the operation data Da indicates the pointer movement operation input, the processor 81 moves the pointer location according to the pointer movement operation input, updates the pointer data Dg, and displays, on the display 12, a map image that the pointer Q overlays at the pointer location after the movement. It should be noted that if the pointer movement operation input indicates a command to move the pointer Q out of the display range of a map image, the processor 81 may move the display range of the map image in step S130 by scrolling the map image according to the command. As an example, the processor 81 may scroll a map image in a direction opposite to a direction indicated by the pointer movement operation input (e.g., the direction in which the left stick 32 is tilted) at a movement speed indicated by the pointer movement operation input (e.g., the angle at which the left stick 32 is tilted) and thereby set the pointer location at a location where the pointer overlays an end of the display range of the map image corresponding to the direction.

Next, the processor 81 determines whether or not an operation of switching the fields of the map image to display one of the fields has been performed (step S132). For example, if the operation data Da indicates that an operation of switching the fields of the map image to display one of the fields has been performed (e.g., a map switching operation input of pressing down the up button 35 or down button 34 of the left controller 3), the result of the determination by the processor 81 in step S132 is positive. If the operation of switching maps has been performed, the processor 81 proceeds to step S133. Otherwise, i.e., if the operation of switching maps has not been performed, the processor 81 proceeds to step S134.

In step S133, the processor 81 executes a process of switching the fields of the map image to display one of the fields, and proceeds to step S134. For example, the processor 81 switches and sets fields of the map image to be displayed, according to the map switching operation input. It should be noted that even when the player character PC's tracks are displayed, overlaying the map image, the processor 81 switches and sets the fields of the displayed map image that the tracks overlay, according to the map switching operation input in step S133.

In step S134, the processor 81 determines whether or not to display the player character PC's tracks in the map image that is being displayed. For example, if the operation data Da indicates an operation input for starting track display (an operation input of pressing down the operation button 55 (X-button)), or if tracks are being displayed at the current time, the result of the determination by the processor 81 in step S134 is positive. If the processor 81 determines to display the player character PC's tracks in the map image, the processor 81 proceeds to step S135. Otherwise, i.e., if the processor 81 determines not to display the player character PC's track in the map image, the processor 81 proceeds to step S136.

In step S135, the processor 81 executes a track display process, and proceeds to step S136. The track display process of step S135 will be described below with reference to FIG. 22.

In FIG. 22, the processor 81 determines whether or not to perform all-track display (step S141). As described above, in the present example, the all-track display mode and the track reproduction display mode can be chosen. Each time the user performs the display mode switch operation input (e.g., an operation input of pressing down the operation button 55 (X-button)), the processor 81 sequentially switches the display mode between the track hide mode (a mode in which only a map image is displayed), the all-track display mode, and the track reproduction display mode. If the display mode switch operation input is not performed, the current display mode is maintained. It should be noted that the display modes may be switched in any order, and any of the all-track display mode and the track reproduction display mode may be set as a default display mode when track display is started after displaying of the map image. In step S141, the processor 81 sets the current display mode based on whether or not the display mode switch operation input has been performed, and if the set display mode is the all-track display mode, the result of the determination by the processor 81 is positive. If the processor 81 determines to perform all-track display, the processor 81 proceeds to step S142. Otherwise, i.e., if the processor 81 determines not to perform all-track display, the processor 81 proceeds to S143.

In step S142, the processor 81 executes an all-track display process, and proceeds to step S143. For example, the processor 81 generates movement tracks in a display form corresponding to the field of the map image that is being displayed, based on all records stored in the record data De (see FIGS. 12 to 14), updates the track data Df, and provides settings for displaying all of the movement tracks such that all of the movement tracks overlay the map image. It should be noted that if the track hide flag indicated by the track hide flag data Di is on, the processor 81 provides settings for displaying only movement tracks in the field of the map image currently displayed, of the generated movement tracks, such that said movement tracks overlay the map image (see FIG. 17). A method for generating and displaying movement tracks in all-track display is similar to that described with reference to FIGS. 12 to 14 and FIG. 17 and the like, and will not be described in further detail.

In step S143, the processor 81 determines whether or not to start track reproduction display. For example, if the track reproduction display mode has been started by the display mode switch operation input indicated by the operation data Da or the like, the result of the determination by the processor 81 in step S143 is positive. If the processor 81 determines to start track reproduction display, the processor 81 proceeds to step S144. Otherwise, i.e., if the processor 81 determines not to start track reproduction display, or if a track reproduction display process has already been started and is being executed, the processor 81 proceeds to step S145.

In step S144, the processor 81 executes a track reproduction start process, and proceeds to step S145. For example, the processor 81 temporarily deletes movement tracks indicated by the track data Df, sets the movement start location SP of movement tracks corresponding to the field of the map image that is being displayed, using a location indicated by the earliest record stored in the record data De (see the upper portion of FIG. 15), updates the track data Df, and starts a process of reproducing the player character PC's movement tracks. In addition, the processor 81 provides settings for disposing and displaying the reproduction location icon image LI at a location in the map image indicated by the movement start location SP (see the upper portion of FIG. 15) such that the reproduction location icon image LI overlays the map image, and provides settings for displaying the in-reproduction layer icon image RI at a location in the layer indication image that shows a field in which the movement start location SP is located (see the upper portion of FIG. 15).

In step S145, the processor 81 determines whether or not track reproduction display is being performed. For example, when the track reproduction display mode is started, the processor 81 starts a process of reproducing the player character PC's movement tracks (see step S144). If the player character PC's movement tracks are being reproduced, or if the track reproduction display mode is being continued after the player character PC's movement tracks have been reproduced until the current location C, the result of the determination by the processor 81 in step S145 is positive. If track reproduction display is being performed, the processor 81 proceeds to step S146. Otherwise, i.e., if track reproduction display is not being performed, the processor 81 proceeds to step S149.

In step S146, the processor 81 executes a track reproduction display process, and proceeds to the next step. For example, the processor 81 reproduces movement tracks in a display form corresponding to a movement field such that the movement tracks extend across a length corresponding to the set reproduction speed, based on records stored in the record data De (see FIGS. 15 and 16), updates the track data Df, and provides settings for displaying the reproduced movement tracks such that the reproduced movement tracks overlay the map image. In addition, the processor 81 provides settings for disposing and displaying the reproduction location icon image LI at a location in the map image indicated by the most recent record in the reproduced movement tracks (i.e., the location of a leading end of extending movement tracks) (see FIGS. 15 and 16) such that the reproduction location icon image LI overlays the map image, and provides settings for displaying the in-reproduction layer icon image RI at a location in the layer indication image that shows the field in which the most recent record is located (see FIGS. 15 and 16). It should be noted that if the track hide flag indicated by the track hide flag data Di is on, the processor 81 provides settings for displaying only movement tracks in the field of the map image currently displayed, of the generated movement tracks, such that said movement tracks overlay the map image. In addition, if the set reproduction speed is zero or if reproduction of movement tracks until the current location C has been finished, the processor 81 provides settings for displaying movement tracks indicated by the track data Df without change such that the movement tracks overlay the map image. The generation and displaying of movement tracks in track reproduction display are similar to those described with reference to FIGS. 15 and 16 and the like, and will not be described in further detail.

Next, the processor 81 determines whether or not to change the reproduction speed (step S147). For example, if the operation data Da indicates the reproduction speed switch operation input (e.g., an operation input of pressing down the operation button 38 (L-button) or the operation button 60 (R-button)) or the reproduction stop operation input (e.g., an operation input of pressing down the operation button 55 (X-button)), the result of the determination by the processor 81 in step S147 is positive. If the processor 81 determines to change the reproduction speed, the processor 81 proceeds to step S148. Otherwise, i.e., if the processor 81 determines not to change the reproduction speed, the processor 81 proceeds to step S149.

In step S148, the processor 81 executes a process of changing and setting the reproduction speed at which movement tracks are reproduced, according to the reproduction speed switch operation input or reproduction stop operation input, and proceeds to step S149. For example, the processor 81 sets the current reproduction speed by increasing/decreasing the reproduction speed according to the reproduction speed switch operation input. In addition, the processor 81 sets the reproduction speed by switching reproduction between stop (reproduction speed: zero) and restart (returning to the reproduction speed before stopping reproduction) according to the reproduction stop operation input.

In step S149, the processor 81 determines whether or not to hide a portion of movement tracks. For example, if the operation data Da indicates the display switch operation input (e.g., an operation input of pressing down the operation button 56 (Y-button)), the processor 81 sequentially switches and sets the display form between a form in which a portion of movement tracks are hidden (movement tracks in the fields other than the field shown by the map image are hidden) and a form in which that portion of movement tracks are displayed. If the processor 81 determines to hide a portion of movement tracks, the processor 81 proceeds to step S151. Otherwise, i.e., if the processor 81 determines to display that portion of movement tracks, the processor 81 proceeds to step S153.

In step S151, the processor 81 sets the track hide flag on, updates the track hide flag data Di, and proceeds to step S154.

In step S153, the processor 81 sets the track hide flag off, updates the track hide flag data Di, and proceeds to step S154.

In step S154, the processor 81 determines whether or not to end track display. For example, if the operation data Da indicates an operation input for ending track display (e.g., a track display end operation input of pressing down an operation button 54 (B-button)), the result of the determination by the processor 81 in step S154 is positive. If the processor 81 determines to end track display, the processor proceeds to step S155. Otherwise, i.e., if the processor 81 determines not to end track display, the processor 81 ends the subroutine.

In step S155, the processor 81 ends track display of the player character PC, and ends the subroutine. For example, the processor 81 provides settings for deleting the movement tracks displayed, overlaying the map image, and various icon images (the reproduction location icon image LI, the in-reproduction layer icon image RI, and the like) used in track display, provides settings for removing movement tracks indicated by the track data Df, and ends track display. In this case, the result of determination in step S134, which is next executed, is negative.

Referring back to FIG. 21, in step S136, the processor 81 determines whether or not to add the mark image P to the map image. For example, if the operation data Da indicates the mark disposition operation input (e.g., an operation input of pressing down the operation button 53 (A-button)), the result of the determination by the processor 81 in step S136 is positive. If the processor 81 determines to add the mark image P, the processor 81 proceeds to step S137. Otherwise, i.e., if the processor 81 determines not to add the mark image P, the processor 81 proceeds to step S138.

In step S137, the processor 81 executes a mark addition process, and proceeds to step S138. For example, the processor 81 updates the mark data Dh such that the predetermined mark image P is disposed at a location in the map image indicated by the pointer data Dg (a position indicated by the pointer Q), overlaying the map image, and provides settings for displaying the map image such that the mark image P overlays the map image.

In step S138, the processor 81 generates and displays a map image on the display 12, and proceeds to the next step. In step S138 (i.e., in the map display mode), a map image is displayed in an entire region of the display 12 without a field image being displayed (see FIGS. 9 to 18). For example, in the state at the time when the processor 81 transitions to the map display mode, the processor 81 generates a map image of the field in which the player character PC is located, according to the above method using the map data Dd, and displays the map image on the display 12. In addition, the processor 81 displays a map image based on the settings provided in steps S131 to S137. For example, in step S133, when the fields of the map image are switched to display one of the fields, the processor 81 generates a map image of the field after the switching according to the above method using the map data Dd, and displays the generated map image on the display 12. In addition, if the result of the determination in step S134 is positive, the processor 81 displays the movement tracks set in step S135 such that the movement tracks overlay the map image. Furthermore, when settings for adding a mark image are provided in step S137, the processor 81 displays the mark image set in the step such that the mark image overlays the map image.

Next, the processor 81 determines whether or not an operation for ending map display has been performed (step S139). For example, if the operation data Da indicates the user's operation input for ending map display, the result of the determination by the processor 81 in step S139 is positive. If an operation for ending map display has been performed, the processor 81 proceeds to step S140. Otherwise, i.e., if an operation for ending map display has not been performed, the processor 81 ends the subroutine.

In step S140, the processor 81 ends the map display process, switches the process mode to the field mode, and ends the subroutine. In this case, the result of determination in the next step S123 is negative.

Referring back to FIG. 20, if in step S123 it is determined that the processor 81 is not currently in the map display mode, the processor 81 executes a player-associated process (step S125), and proceeds to step S126. In the player-associated process, various processes (e.g., a control process related to a player character) are executed based on the user's operation input. The player-associated process of step S125 will be described below with reference to FIG. 23.

In FIG. 23, the processor 81 determines whether or not the user has given a command to switch process modes, with reference to the operation data Da (step S161). For example, if the user has given a command to display a map image (e.g., a command given by an operation input of pressing down the operation button 47 (minus button)), the result of the determination by the processor 81 in step S161 is positive. If a command to switch process modes has been given, the processor 81 proceeds to step S162. Otherwise, i.e., if a command to switch process modes has not been given, the processor 81 proceeds to step S163.

In step S162, the processor 81 switches process modes according to the user's command, and proceeds to step S169. Specifically, if the user's operation input indicated by the operation data Da indicates a command to display a map image, the process mode is switched to the map display mode.

If in step S161 it is determined that a command to switch process modes has not been given, the processor 81 determines whether or not the processor 81 is during an operation acceptance period that the user's operation input for the player character PC is accepted (step S163). Here, in the present example, it is assumed that the operation acceptance period excludes an action period during which the player character PC performs a predetermined action (e.g., an action controlled in step S165 described below) according to the user's operation input for the player character PC. If the processor 81 is during the operation acceptance period, the processor 81 proceeds to step S164. Otherwise, i.e., if the processor 81 is not during the operation acceptance period, the processor 81 proceeds to step S168.

In step S164, the processor 81 determines whether or not the user's operation input for giving an action command to the player character PC to perform an action has been performed, based on the operation data Da. Here, the action command is for causing the player character PC to perform an attack action, a jump action, or the like, for example. If an action command to the player character PC has been given, the processor 81 proceeds to step S165. Otherwise, i.e., if an action command to the player character PC has not been given, the processor 81 proceeds to step S166.

In step S165, the processor 81 causes the player character PC to start an action corresponding to the user's action command, updates the player character data Db, and proceeds to step S169. After the player character PC starts an action in step S165, the player character PC is controlled by a process of step S168 described below such that the player character PC performs the action for a predetermined period of time.

If in step S164 it is determined that an action command has not been given to the player character PC, the processor 81 determines whether or not the user's operation input for giving a move command to the player character PC has been performed, based on the operation data Da (step S166). Here, the move command is for causing the player character PC to move in a field. If a move command has been given to the player character PC, the processor 81 proceeds to step S167. Otherwise, i.e., if a move command has not been given to the player character PC, the processor 81 proceeds to step S168.

In step S167, the processor 81 causes the player character PC to move in a field according to the user's move command, updates the player character data Db, and proceeds to step S169.

In step S168, the processor 81 controls the player character PC such that the player character PC continues to perform an action started in step S165, or various actions such as an action that is performed when there is no input, updates the player character data Db, and proceeds to step S169. It should be noted that when step S168 is executed once, the processor 81 controls the player character PC such that the player character PC performs one frame's worth of action. When step S168 is repeatedly executed over a plurality of frames, the player character PC performs a series of actions according to the user's action command. It should be noted that if a command to the player character PC to perform an action has not been given by the user (e.g., the action started in step S165 has ended), the processor 81 may not cause the player character PC to perform an action, or may cause the player character PC to perform an action such that the player character PC's behavior appears to be natural (e.g., an action of looking around or rocking the body, or an action based on virtual physical calculation (e.g., Newton's first law or Newton's law of universal gravitation) or the like in the virtual space) in step S168.

In step S169, the processor 81 adds a record of the location of the player character PC in the virtual space as the most recent record to the record data De, and proceeds to the next step. It should be noted that addition of a location record may be executed in groups of several frames instead of on a frame-by-frame basis.

Next, the processor 81 executes a display control process (step S170), and ends the subroutine. For example, the processor 81 disposes the player character PC in the virtual space based on the player character data Db. In addition, the processor 81 disposes other characters and objects in the virtual space. In addition, the processor 81 sets the location and/or orientation of a virtual camera for generating a display image, based on the virtual camera data Dc, and disposes the virtual camera in the virtual space. Thereafter, the processor 81 performs control to generate an image (field image) of the virtual space as viewed from the virtual camera, and display the virtual space image on the display 12. It should be noted that the processor 81 may execute a process of controlling a movement of the virtual camera in the virtual space based on the location and pose of the player character PC, and update the virtual camera data Dc. In addition, the processor 81 may move the virtual camera in the virtual space based on the operation data Da, and update the virtual camera data Dc. In addition, the processor 81 may generate a map image in addition to the virtual space image, and display the map image such that the map image overlays a portion of the virtual space image.

Referring back to FIG. 20, in step S126, the processor 81 determines whether or not to end the game process. In step S126, the game process is ended, for example, if a condition for ending the game process is satisfied, the user has performed an operation of ending the game process, or the like. If the processor 81 determines not to end the game process, the processor 81 returns to step S122, and repeats the process. Otherwise, i.e., if the processor 81 determines to end the game process, the processor 81 ends the flowchart. Following this, steps S122 to S126 are repeatedly executed until the processor 81 determines to end the game process in step S126.

Thus, in the present example, in the case in which a map image having a plurality of fields corresponding to heights in a virtual space is used, a player character PC's movement tracks in a virtual space can be displayed, overlaying the map image.

The game system 1 may be any suitable apparatus, including handheld game apparatuses, personal digital assistants (PDAs), mobile telephones, personal computers, cameras, tablet computers, and the like.

In the foregoing, the information process (game process) is performed in the game system 1 by way of example. Alternatively, at least a portion of the process steps may be performed in another apparatus. For example, when the game system 1 can also communicate with another apparatus (e.g., a server, another information processing apparatus, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above example, the information processes can be performed by the processor 81 of the game system 1 executing predetermined programs. Alternatively, all or a portion of the above processes may be performed by a dedicated circuit included in the game system 1.

Here, according to the above variation, the present example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of step S may be performed by substantially any of the apparatuses, and the present example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage medium.

While several example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present example and common technical knowledge. It should be understood throughout the present specification that expression of a singular form includes the concept of its plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present example pertain. If there is any inconsistency or conflict, the present specification (including the definitions) shall prevail.

As described above, the present example is applicable as a game program, game system, game apparatus, game processing method, and the like that, in the case in which a map image having a plurality of layers corresponding to heights in a virtual space are used, are capable of displaying a player character's tracks based on records in the virtual space in the map image.

What is claimed is:

1. A non-transitory computer-readable storage medium having stored therein instructions that, when executed, cause a computer of an information processing apparatus to execute game processing comprising:

executing a game process of controlling movement of at least a player character in a virtual space based on a user's operation input, and storing time-series records of locations of the player character from the start of a game into a storage medium;

displaying one of a plurality of layers corresponding to heights in the virtual space in a map image having the plurality of layers according to a first command based on the user's operation input, wherein the map image shows field information in the virtual space; and executing track display according to a second command based on the user's operation input when the map image is being displayed, wherein the player character's tracks based on the records are displayed, overlaying the map image of the layer being displayed, and a portion of the tracks based on the records at the height corresponding to the layer being displayed are displayed in a display form different from that of portions of the tracks based on the records at the heights corresponding to the layers other than the layer being displayed.

2. The non-transitory computer-readable storage medium according to claim 1, wherein the game processing further comprises:

when the map image is being displayed or when the track display is being executed, switching the layers of the map image according to a third command to choose one of the layers based on the user's operation input.

3. The non-transitory computer-readable storage medium according to claim 2, wherein when the track display is being executed, a portion of the tracks based on the records at the height corresponding to the layer being displayed are displayed in a line having a first thickness, and portions of the tracks based on the records at the heights corresponding to the layers other than the layer being displayed are displayed in a line having a second thickness smaller than the first thickness.

4. The non-transitory computer-readable storage medium according to claim 1, wherein as the track display, all-track display is executed in which all of the tracks from the start of the game until a most recent one of the records, or all of the tracks based on a period of time's worth of the records, are displayed, overlaying the map image.

5. The non-transitory computer-readable storage medium according to claim 1, wherein as the track display, track reproduction display is executed in which the tracks are updated with time and are displayed, overlaying the map image, in time order from the start of the game or from a time point before a period of time from a most recent one of the records.

6. The non-transitory computer-readable storage medium according to claim 5, wherein the game processing further comprises:

when the map image is being displayed and when the track display is being executed, displaying a layer indication image showing the layers that are allowed to be chosen and displayed and the layer being displayed, and during the track reproduction display, an icon image is additionally displayed at a location in the layer indication image that shows the layer corresponding to a most recently updated portion of the tracks that are updated with time.

7. The non-transitory computer-readable storage medium according to claim 4, wherein the game processing further comprises:

during the track display, switching between display and undisplay of portions of the tracks based on the records at the heights corresponding to the layers other than the layer being displayed, according to a fourth command based on the user's operation input.

8. The non-transitory computer-readable storage medium according to claim 1, wherein the game processing further comprises:

when the map image is being displayed and when the track display is being executed, additionally disposing and displaying a mark image at a designated location in the map image of the layer being displayed, according to a fifth command based on the user's operation input.

9. The non-transitory computer-readable storage medium according to claim 1, wherein the virtual space includes at least a ground field and an airspace field, and the map image includes at least a ground map image of the layer indicating the ground field and an airspace map image of the layer indicating the airspace field.

10. The non-transitory computer-readable storage medium according to claim 9, wherein the virtual space further includes an underground field, and the map image further includes an underground map image of the layer indicating the underground field.

11. A game system comprising:

a processor; and a memory storing instructions that, when executed, cause the game system to perform operations including:

executing a game process of controlling movement of at least a player character in a virtual space based on a user's operation input, and storing time-series records of locations of the player character from the start of a game into a storage medium;

displaying one of a plurality of layers corresponding to heights in the virtual space in a map image having the plurality of layers according to a first command based on the user's operation input, wherein the map image shows field information in the virtual space; and executing track display according to a second command based on the user's operation input when the map image is being displayed, wherein the player character's tracks based on the records are displayed, overlaying the map image of the layer being displayed, and a portion of the tracks based on the records at the height corresponding to the layer being displayed are displayed in a display form different from that of portions of the tracks based on the records at the heights corresponding to the layers other than the layer being displayed.

12. The game system according to claim 11, wherein further, when the map image is being displayed or when the track display is being executed, the layers of the map image are switched according to a third command to choose one of the layers based on the user's operation input.

13. The game system according to claim 12, wherein when the track display is being executed, a portion of the tracks based on the records at the height corresponding to the layer being displayed are displayed in a line having a first thickness, and portions of the tracks based on the records at the heights corresponding to the layers other than the layer being displayed are displayed in a line having a second thickness smaller than the first thickness.

14. The game system according to claim 11, wherein as the track display, all-track display is executed in which all of the tracks from the start of the game until a most recent one of the records, or all of the tracks based on a period of time's worth of the records, are displayed, overlaying the map image.

15. The game system according to claim 11, wherein as the track display, track reproduction display is executed in which the tracks are updated with time and are displayed, overlaying the map image, in time order from the start of the game or from a time point before a period of time from a most recent one of the records.

16. The game system according to claim 15, wherein further, when the map image is being displayed and when the track display is being executed, a layer indication image showing the layers that are allowed to be chosen and displayed and the layer being displayed is displayed; and during the track reproduction display, an icon image is additionally displayed at a location in the layer indication image that shows the layer corresponding to a most recently updated portion of the tracks that are updated with time.

17. The game system according to claim 14, wherein further, during the track display, switching is performed between display and undisplay of portions of the tracks based on the records at the heights corresponding to the layers other than the layer being displayed, according to a fourth command based on the user's operation input.

18. The game system according to claim 11, wherein further, when the map image is being displayed and when the track display is being executed, a mark image is additionally disposed and displayed at a designated location in the map image of the layer being displayed, according to a fifth command based on the user's operation input.

19. The game system according to claim 11, wherein the virtual space includes at least a ground field and an airspace field, and the map image includes at least a ground map image of the layer indicating the ground field and an airspace map image of the layer indicating the airspace field.

20. The game system according to claim 19, wherein the virtual space further includes an underground field, and the map image further includes an underground map image of the layer indicating the underground field.

21. A game apparatus comprising:

a processor; and a memory storing instructions that, when executed, cause the game apparatus to perform operations including:

executing a game process of controlling movement of at least a player character in a virtual space based on a user's operation input, and storing time-series records of locations of the player character from the start of a game into a storage medium;

displaying one of a plurality of layers corresponding to heights in the virtual space in a map image having the plurality of layers according to a first command based on the user's operation input, wherein the map image shows field information in the virtual space; and executing track display according to a second command based on the user's operation input when the map image is being displayed, wherein the player character's tracks based on the records are displayed, overlaying the map image of the layer being displayed, and a portion of the tracks based on the records at the height corresponding to the layer being displayed are displayed in a display form different from that of portions of the tracks based on the records at the heights corresponding to the layers other than the layer being displayed.

22. The game apparatus according to claim 21, wherein further, when the map image is being displayed or when the track display is being executed, the layers of the map image are switched according to a third command to choose one of the layers based on the user's operation input.

23. The game apparatus according to claim 22, wherein when the track display is being executed, a portion of the tracks based on the records at the height corresponding to the layer being displayed are displayed in a line having a first thickness, and portions of the tracks based on the records at the heights corresponding to the layers other than the layer being displayed are displayed in a line having a second thickness smaller than the first thickness.

24. The game apparatus according to claim 21, wherein as the track display, all-track display is executed in which all of the tracks from the start of the game until a most recent one of the records, or all of the tracks based on a period of time's worth of the records, are displayed, overlaying the map image.

25. The game apparatus according to claim 21, wherein as the track display, track reproduction display is executed in which the tracks are updated with time and are displayed, overlaying the map image, in time order from the start of the game or from a time point before a period of time from a most recent one of the records.

26. A game processing method for causing a processor of an information processing apparatus to at least:

execute a game process of controlling movement of at least a player character in a virtual space based on a user's operation input, and store time-series records of locations of the player character from the start of a game into a storage medium;

display one of a plurality of layers corresponding to heights in the virtual space in a map image having the plurality of layers according to a first command based on the user's operation input, wherein the map image shows field information in the virtual space; and execute track display according to a second command based on the user's operation input when the map image is being displayed, wherein the player character's tracks based on the records are displayed, overlaying the map image of the layer being displayed, and a portion of the tracks based on the records at the height corresponding to the layer being displayed are displayed in a display form different from that of portions of the tracks based on the records at the heights corresponding to the layers other than the layer being displayed.

27. The game processing method according to claim 26, wherein further, when the map image is being displayed or when the track display is being executed, the layers of the map image are switched according to a third command to choose one of the layers based on the user's operation input.

28. The game processing method according to claim 27, wherein when the track display is being executed, a portion of the tracks based on the records at the height corresponding to the layer being displayed are displayed in a line having a first thickness, and portions of the tracks based on the records at the heights corresponding to the layers other than the layer being displayed are displayed in a line having a second thickness smaller than the first thickness.

29. The game processing method according to claim 26, wherein as the track display, all-track display is executed in which all of the tracks from the start of the game until a most recent one of the records, or all of the tracks based on a period of time's worth of the records, are displayed, overlaying the map image.

30. The game processing method according to claim 26, wherein as the track display, track reproduction display is executed in which the tracks are updated with time and are displayed, overlaying the map image, in time order from the start of the game or from a time point before a period of time from a most recent one of the records.

* * * * *